United States Patent
Fuji

(10) Patent No.: US 6,418,403 B2
(45) Date of Patent: *Jul. 9, 2002

(54) TRANSLATING APPARATUS, DICTIONARY SEARCH APPARATUS, AND TRANSLATING METHOD

(75) Inventor: Masaru Fuji, Kawasaki (JP)

(73) Assignee: Fujitsu Limited, Kawasaki (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/525,020

(22) Filed: Mar. 14, 2000

Related U.S. Application Data

(62) Division of application No. 08/728,852, filed on Oct. 10, 1996, now Pat. No. 6,151,570.

(30) Foreign Application Priority Data

Nov. 27, 1995 (JP) .............................. 7-306981

(51) Int. Cl.⁷ .......................... G06F 17/21; G06F 17/28
(52) U.S. Cl. ............... 704/10; 704/7; 707/532
(58) Field of Search ................. 704/1, 9, 10; 767/530, 767/531, 532, 533

(56) References Cited

U.S. PATENT DOCUMENTS

| | | |
|---|---|---|
| 4,683,553 A | 7/1987 | Mollier |
| 4,796,181 A | 1/1989 | Wiedemer |
| 4,833,611 A * | 5/1989 | Fukumochi et al. ........... 704/5 |
| 4,894,779 A | 1/1990 | Suzuki et al. |
| 4,916,614 A * | 4/1990 | Kaji et al. ...................... 704/2 |
| 4,980,829 A | 12/1990 | Okajima et al. |
| 4,989,233 A | 1/1991 | Schakowsky et al. |
| 5,005,127 A | 4/1991 | Kugimiya et al. |
| 5,010,486 A | 4/1991 | Suzuki et al. |
| 5,047,928 A | 9/1991 | Wiedemer |
| 5,083,309 A | 1/1992 | Beysson |
| 5,155,680 A | 10/1992 | Wiedemer |
| 5,195,032 A | 3/1993 | Matsui et al. |
| 5,251,130 A | 10/1993 | Andrews et al. |
| 5,327,497 A | 7/1994 | Mooney et al. |
| 5,371,674 A | 12/1994 | Obuchi |
| 5,386,369 A | 1/1995 | Christiano |
| 5,475,586 A | 12/1995 | Sata et al. |
| 5,533,103 A | 7/1996 | Peavey et al. |
| 5,535,120 A | 7/1996 | Chong et al. |
| 5,633,909 A | 5/1997 | Fitch |
| 5,642,522 A * | 6/1997 | Zaenen et al. ................. 704/10 |
| 5,682,421 A | 10/1997 | Glovitz et al. |
| 5,689,560 A | 11/1997 | Cooper et al. |
| 5,732,276 A | 3/1998 | Komatsu et al. |
| 5,845,306 A * | 12/1998 | Schabes et al. ............... 704/10 |
| 5,995,922 A * | 11/1999 | Penteroudakis et al. ....... 704/9 |
| 6,041,293 A * | 3/2000 | Shibata et al. ................. 704/4 |
| 6,278,967 B1 * | 8/2001 | Akers et al. .................... 704/2 |

\* cited by examiner

*Primary Examiner*—Patrick N. Edouard
(74) *Attorney, Agent, or Firm*—Staas & Halsey LLP

(57) ABSTRACT

If a context process range extending unit cannot obtain context information required by a context processing unit, from a range to be translated, it extends the context process range. Then, the context processing unit performs a context process, and passes extracted context information to a translation processing unit in order to perform translation, based on the extended context process range.

2 Claims, 19 Drawing Sheets

| SENTENCE # | ORIGINAL TEXT |
|---|---|
| 31 | The talks were held in the Upper House. |
| 32 | This has forced the party to change its stance. |

FIG. 5

| This | has | forced | the | party | to | change | its | stance. |
|---|---|---|---|---|---|---|---|---|
| これ | (AUXILIARY VERB) | 強制した | (DEFINITE ARTICLE) | パーティ 政党 | (FUNCTION WORD) | 変える | その | 姿勢 スタンス |

FIG. 6

| party | | |
|---|---|---|
| TRANSLATED WORD | FIELD | |
| パーティ | GENERAL | |
| 政党 | POLITICAL | |

| stance | | |
|---|---|---|
| TRANSLATED WORD | FIELD | |
| 姿勢 | GENERAL | |
| スタンス | SPORTS | |

FIG. 7

| This | has | forced | the | party | to | change | its | stance. |
|---|---|---|---|---|---|---|---|---|
| Ceci | a | forcé | la | parti | á | changer | sa | position. |
| | | | | groupe | | | | |

FIG. 8

| party | |
|---|---|
| TRANSLATED WORD | FIELD |
| parti groupe | POLITICAL GENERAL |

FIG. 9

| | POLITICAL NEWS | OPERATING MANUAL |
|---|---|---|
| DA / DEARU TONE | ○ | |
| DESU / MASU TONE | | ○ |
| IMPERATIVE FORM | | ○ |
| PASSIVE VOICE | ○ | |

FIG. 10

The talks were held in the Upper House.
This has forced the party to change
its stance.

The talks were held in the Upper House.
This has forced the party to change
its stance.

|  | FIELD | DOCUMENT TYPE | ABBREVIATION | CORRESPONDENCE |
|---|---|---|---|---|
| SENTENCE : FORWARD DIRECTION |  |  | ○ | ○ |
| SENTENCE : BACKWARD DIRECTION | ○ |  | ○ |  |
| PARAGRAPH : FORWARD DIRECTION | ○ | ○ |  |  |
| PARAGRAPH : BACKWARD DIRECTION | ○ | ○ |  |  |

FIG. 18

The talks were held in the Upper House.
This has forced the party to change
its stance.

70

TRANSLATING APPARATUS, DICTIONARY SEARCH APPARATUS, AND TRANSLATING METHOD

This application is a divisional of application number 08/728,852, filed Oct. 10, 1996, now allowed now U.S. Pat. No. 6,151,570.

FIELD OF THE INVENTION

The present invention relates to a translating apparatus, a dictionary search apparatus, and a translating method, which are preferably applied for when translation is to be efficiently performed based on context in a machine translating process.

DESCRIPTION OF THE RELATED ART

Conventional machine translation is performed in sentences due to the limitation of a processing capability. For example, if a text written in a foreign language is translated, a grammatical structure of the text to be translated and a knowledge of the words used are necessary.

However, an understandable text can often not be obtained if context information, that is, a meaning of one sentence to be translated in the entire text, is not properly interpreted, even if the grammatical structure of the text to be translated, and the knowledge of words, etc. used are known.

If it cannot be determined whether the English word "car" means either an "automobile" or a "railroad car" from the information included in a sentence, a sentence preceding or succeeding the sentence in question, or the context of the entire text must be referenced in order to determine the meaning of the one word.

Actually, not only the simple selection of a translated word, but also an interpretation of a complex meaning is required to be made based on the context.

In recent years, a short sentence has been able to be analyzed with high accuracy, thereby performing translation with higher accuracy according to a context process.

This context process enables the following processes to be performed, which could not be realized by using only a sentence.

Selecting a translated word by estimating a field of a document to be translated Selecting a suitable expression method by estimating a type of a document to be translated Removing ambiguity existing in a reference relationship Completing an abbreviation A mechanism and a method for performing a translation process using context information for a document to be translated, have been developed. Additionally, a method or apparatus for learning context information, and a translating apparatus for performing a translation process using learned context information, have been developed.

However, the translation process using a conventional context process is performed only when an entire document is specified as a translation target.

That is, if a portion of a document is specified as a translation target, the context process is not performed.

Therefore, when a portion of a document such as one sentence, one paragraph, etc. is translated, the entire document must be specified as a translation target in order to obtain accurate translation using the context process. As a result, it takes a large amount of time to perform the process.

SUMMARY OF THE INVENTION

An object of the present invention is to provide a translating apparatus, a dictionary search apparatus, and a translating method for translating a portion of a document efficiently and accurately.

According to a feature of the present invention, a range to be translated and a context process range in original text are set separately. Therefore, even if only a portion of a document is specified as a range to be translated, it can be translated efficiently and accurately by referencing context outside the range to be translated.

According to an additional feature of the present invention, a range to be translated and a context process range in original text are separately set to perform a context process. As a result, a translation process is performed by referencing context outside the range to be translated, thereby translating the portion of a document efficiently and accurately.

According to a further feature of the present invention, field estimation is made as a context process. Even if there is no word identifying a field in a range to be translated, the field can be identified according to context outside the range to be translated. As a result, a suitable translation process depending on a field can be performed.

According to a still further feature of the present invention, document type estimation is made as a context process. Even if there is no expression which allows a document type to be identified in a range to be translated, a suitable translation process depending on a document type can be performed by identifying the document type according to context outside the range to be translated.

According to a still further feature of the present invention, an abbreviation is estimated as a context process. Even if there is no complete form of the abbreviation in a range to be translated, it can be searched according to context outside the range to be translated. As a result, a translation process can be performed with completion of an abbreviation.

According to a still further feature of the present invention, a reference destination is estimated as a context process. Even if a range to be translated includes no word pointed to by a pronoun included in this range, a translation process can be performed while replacing the pronoun depending on need, by searching the word pointed to by the pronoun according to context outside the range to be translated.

According to a still further feature of the present invention, a sentence to be translated is identified according to a range to be translated. As a result, a translation process can be performed accurately.

According to a still further feature of the present invention, a group of sentences to be translated is identified according to a range to be translated. As a result, a translation process can be performed accurately.

According to a still further feature of the present invention, a sentence to be translated is identified by ignoring an inline tag. That is, a translation process can be accurately performed by removing a portion unrelated to translation.

According to a still further feature of the present invention, a sentence to be translated is highlighted. As a result, a translation process can be performed while recognizing the sentence to be translated.

According to a still further feature of the present invention, a first word having a plurality of translated words, and one of second words closest to the location of the first word among second words representing the translated words of the first word, are highlighted. As a result, a state of a context process can be recognized with ease by displaying context information simply.

According to a still further feature of the present invention, a sentence to be translated is highlighted with a first method, and a context process range is highlighted with a second method. As a result, a translation process can be performed while recognizing the context process range, by making a distinction between the sentence to be translated and the context process range.

According to a still further feature of the present invention, a word at a reference destination and a word at a reference source are highlighted. As a result, a translation process can be performed while recognizing a state of a context process.

According to a still further feature of the present invention, an abbreviation and its complete form are highlighted. As a result, a translation process can be performed while recognizing a state of a context process.

According to a still further feature of the present invention, a context process range is extended if a translated sentence corresponding to an original sentence cannot be identified. If context information which allows a translated sentence to be identified is not included in a range to be translated, the translated sentence can be identified according to context outside the range to be translated. As a result, a portion of a document can be translated efficiently and accurately.

According to a still further feature of the present invention, a context process range is extended in sentences until a sentence to be translated corresponding to an original sentence can be determined. As a result, a portion of a document can be translated efficiently and accurately by performing a context process such as estimating an abbreviation, estimating a reference destination, etc. efficiently.

According to a still further feature of the present invention, a context process range is extended in paragraphs in correspondence with a range to be translated until a translated sentence corresponding to an original sentence can be determined. As a result, a portion of a document can be translated efficiently and accurately by performing a context process such as estimating a field, estimating a document type, etc. efficiently.

According to a still further feature of the present invention, a direction in which a context process range is extended is determined according to a type of a context process. As a result, the context process is efficiently performed, thereby translating a portion of a document efficiently and accurately.

According to a still further feature of the present invention, a context process range is extended in sentences in a forward direction until a translated sentence corresponding to an original sentence can be determined. The context process such as estimating a reference destination is performed efficiently, thereby translating a portion of a document efficiently and accurately.

According to a still further feature of the present invention, a context process range is set in correspondence with a range to be translated separated into paragraphs, if the range to be translated in original text straddles a plurality of paragraphs. As a result, even if a topic changes at the beginning of a next paragraph, a context process can be performed accurately by extracting context corresponding to the range to be translated correctly, thereby performing a context process correctly.

According to a still further feature of the present invention, an inline tag is removed from a context process range. That is, by removing a portion unrelated to context, a context process can be performed efficiently.

According to a still further feature of the present invention, a context process range is stopped from extending at a boundary of context. As a result, a context process can be performed accurately and quickly by performing the context process in a context process range including context corresponding to a range to be translated.

According to a still further feature of the present invention, context information is displayed in correspondence with a range to be translated in original text. As a result, a translation process can be performed while recognizing a state of a context process in the range to be translated.

According to a still further feature of the present invention, a plurality of pieces of context information are displayed as candidates if a translated sentence corresponding to an original sentence cannot be determined. As a result, a translation process can be performed while recognizing a state of a context process being performed in a range to be translated.

According to a still further feature of the present invention, context information includes a field name, document type, complete form of an abbreviation, or a word at a reference destination. As a result, a translation process can be performed while recognizing the field name, document type, complete form, or the reference destination.

According to a still further feature of the present invention, if a range to be translated in original text straddles a plurality of paragraphs, it is divided into a plurality of paragraphs to perform a context process. As a result, even if a topic changes at the beginning of a next paragraph, context corresponding to a range to be translated can be extracted correctly. Therefore, a translation process can be performed accurately.

According to a still further feature of the present invention, a context process of original text is performed based on a context process range which is set, and a translated word corresponding to an original word is determined based on text in the context process range. As a result, a dictionary search is properly performed in consideration of context.

According to a still further feature of the present invention, a context process range is extended if a translated word corresponding to an original word cannot be determined. As a result, a dictionary search can be properly made by allowing a context process to be performed efficiently.

According to a still further feature of the present invention, a context process range is extended in sentences until a translated word corresponding to an original word can be determined. That is, by allowing a context process such as estimating an abbreviation, etc., to be performed efficiently, a dictionary search can be made efficiently and accurately.

According to a still further feature of the present invention, field estimation is made as a context process. If there are a plurality of translated words corresponding to an original word, the field of the original word is estimated with a context process in order to select a translated word corresponding to the estimated field. As a result, a dictionary search is performed accurately.

According to a still further feature of the present invention, an abbreviated expression is estimated as a context process. By allowing a complete form of an abbreviation to be searched, a dictionary search can be performed accurately.

According to a still further feature of the present invention, a meaning of a word to be searched is determined according to context in a context process range. As a result, a dictionary search is performed in consideration of context, thereby performing the dictionary search accurately.

According to a still further feature of the present invention, context of original text outside a range to be translated is referenced when a portion of the original text is translated. As a result, even if the portion of the original text is specified as the range to be translated, the context outside the range to be translated is referenced. Therefore, the portion of the document can be translated efficiently and accurately.

According to a still further feature of the present invention, if there are first and second translated words respectively belonging to first and second fields, which correspond to a first original word in a range to be translated of original text, a second original word outside the range to be translated of the original text is referenced. If the second original word belongs to the first field, the first translated word is selected for the first original word. As a result, the field of the first original word in the range to be translated is estimated based on context outside the range to be translated, thereby determining a translated word of the first original word based on the estimated field.

According to a still further feature of the present invention, data in a conversion range is converted based on context in a context process range. Data is converted in consideration of information other than the data in the conversion range, thereby converting the data accurately.

BRIEF DESCRIPTION OF THE DRAWINGS

FIG. 5 shows an example of original text input to the translating apparatus according to the first embodiment of the present invention;

FIG. 6 shows a correspondence between an original sentence (English) input to the translating apparatus according to the first embodiment of the present invention and a translated sentence (Japanese) output from the translating apparatus;

FIG. 7 shows a correspondence table between original words (English) and corresponding translated words (Japanese) provided by the translating apparatus according to the first embodiment of the present invention;

FIG. 8 shows a correspondence table between an original sentence (English) input to the translating apparatus according to the first embodiment of the present invention and a translated sentence (French) output from the translating apparatus;

FIG. 9 shows a correspondence table between an original word (English) and corresponding translated words in respective fields (French), provided by the translating apparatus according to the first embodiment of the present invention;

FIG. 10 shows a correspondence table between a document type and an expression method of translation, implemented by the translating apparatus according to a second embodiment of the present invention;

FIG. 13 is a schematic diagram showing a method for specifying a translation portion of an original text input to the translation apparatus according to the first embodiment of the present invention;

FIG. 14 shows a method for specifying a translation range of original text input to the translating apparatus according to the second embodiment of the present invention;

FIG. 18 shows a correspondence table between a method for extending a context process range and a context process type, implemented by the translating apparatus according to the third embodiment of the present invention;

DETAILED DESCRIPTION OF THE PREFERRED EMBODIMENTS

Figure 1:
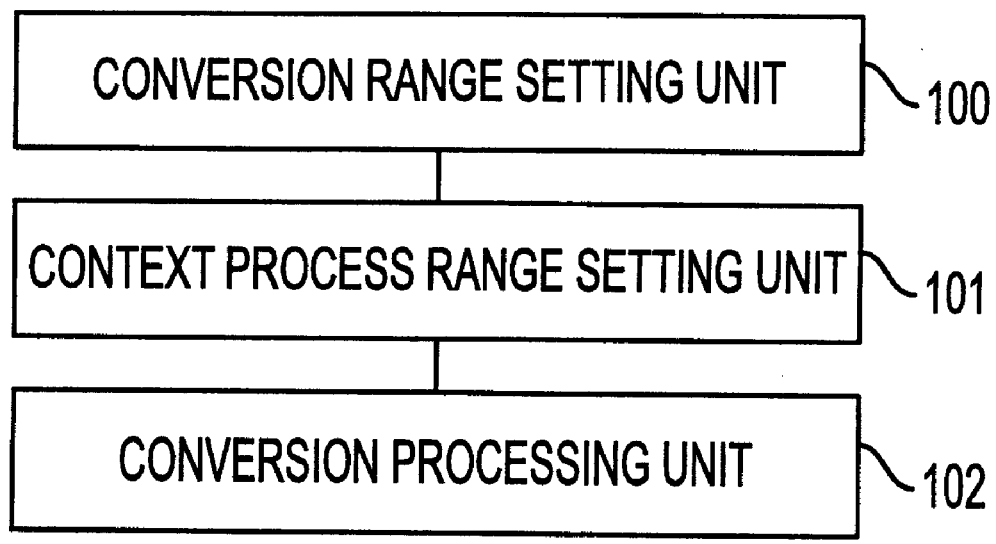
FIG. 1 is a block diagram showing the configuration of a data conversion apparatus according to an embodiment of the present invention.

FIG. 1 is a block diagram showing the configuration of a data conversion apparatus according to an embodiment of the present invention. The data conversion apparatus shown in this figure comprises a conversion range setting unit 100 for setting a conversion range of data, a context process range setting unit 101 for setting a context process range where a context process is performed, and a conversion processing unit 102 for converting the data in consideration of context in the context process range. As a result, data can be converted in consideration of context information obtained from other than data in a conversion range, thereby converting the data accurately.

Figure 2:
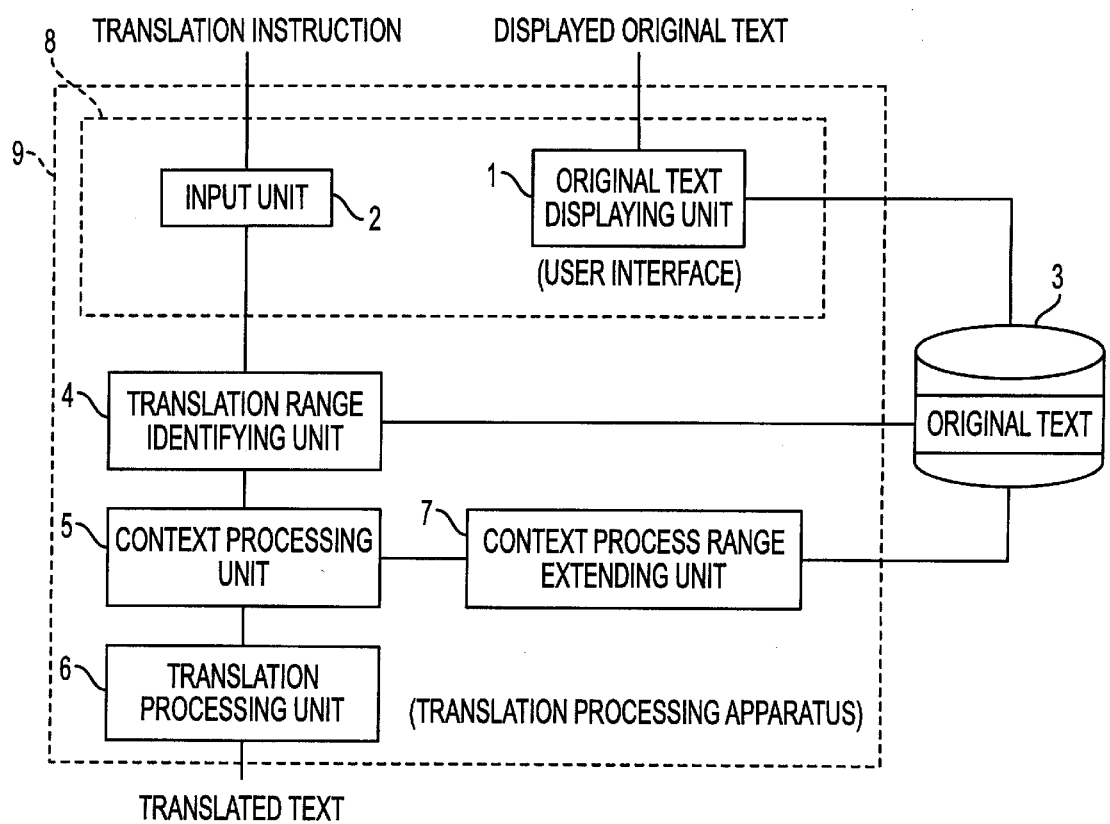
FIG. 2 is a block diagram showing the configuration of a translating apparatus according to the embodiment of the present invention.

Provided next is the explanation about a translating apparatus according to an embodiment of the present invention. FIG. 2 is a simplified block diagram showing configuration of the translating apparatus according to the embodiment of the present invention. This apparatus is intended to quickly perform a translation process by obtaining appropriate context from a neighborhood of a range to be translated depending on need, when a portion of a document is specified as the range to be translated.

In FIG. 2, a translation processing apparatus 9 comprises a user interface 8, translation range identifying unit 4, context processing unit 5, translation processing unit 6, and a context process range extending unit 7. The user interface 8 comprises an original text displaying unit 1 and an input unit 2.

The original text displaying unit 1 is intended to display original text stored in a storing unit 3 for a translation operator. The original text displaying unit 1 is implemented by, for example, a CRT display.

The input unit 2 is intended to accept a translation instruction given by a translation operator. The translation operator instructs the input unit 2 of a range to be translated while watching the original text displaying unit 1. The input unit 2 is implemented by, for example, a mouse, a keyboard, etc.

The storing unit 3 is intended to store original text, which is implemented by, for example, a hard disk unit, optical disk unit, etc.

The translation range identifying unit 4 is intended to extract a portion to be translated in original text from the storing unit 3, according to a translation instruction from the input unit 2. Note that a system instructing a sentence to be translated using a sentence number, etc. does not always require the translation range identifying unit 4.

The context processing unit 5 is intended to perform a context process in a context process range specified by the context process range extending unit 7 for a sentence to be translated identified by the translation range identifying unit 4.

The translation processing unit 6 is intended to translate a sentence to be translated according to context obtained by the context processing unit 5, and output a translated sentence.

The context process range extending unit 7 is intended to extend a context process range where a context is retrieved by reading an original text around a range to be translated from the storing unit 3, if context information required by the context processing unit 5 cannot be obtained from a sentence to be translated which is identified by the translation range identifying unit 4.

Figure 3:
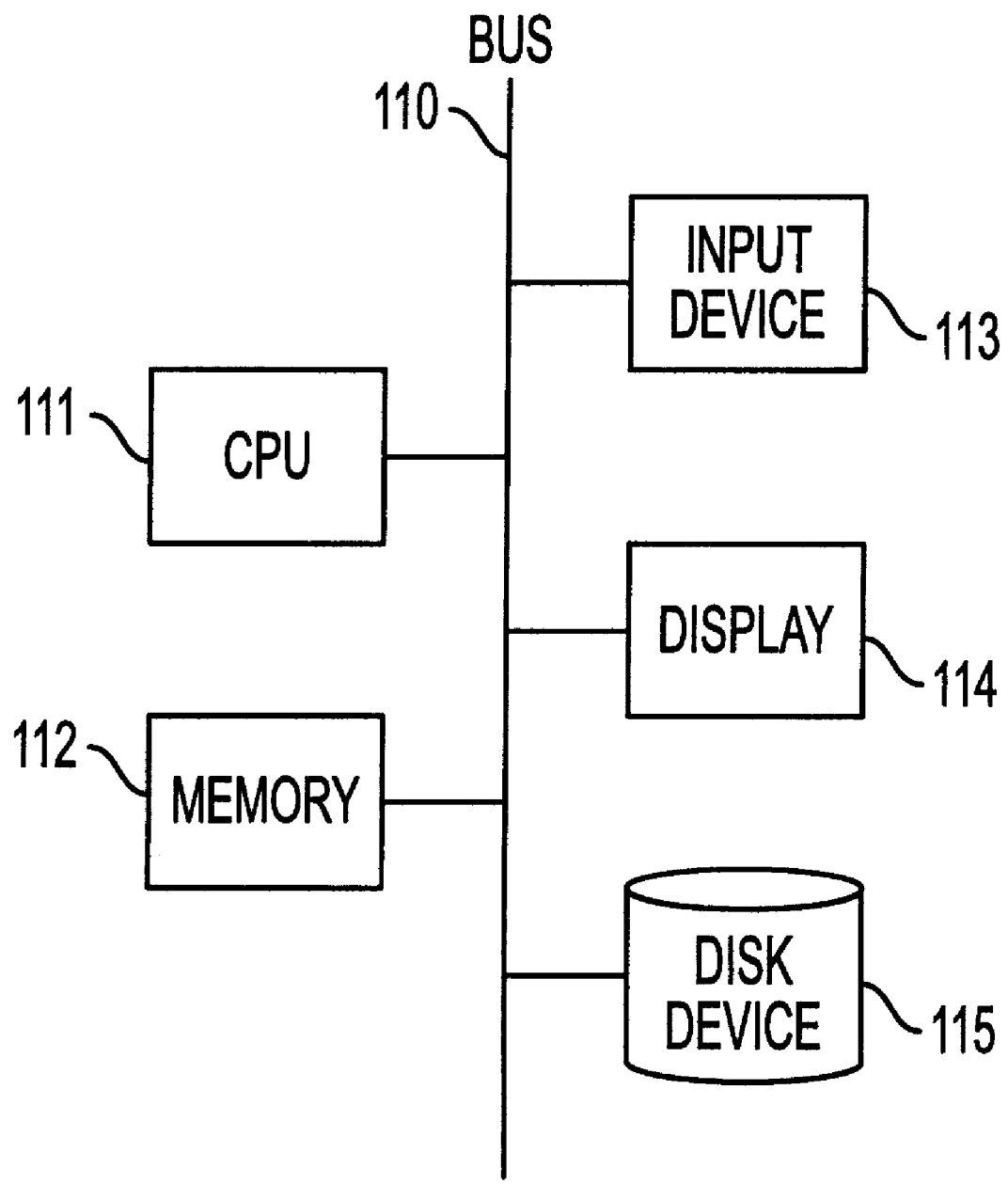
FIG. 3 is a schematic diagram showing the configuration of a computer system of the translation apparatus according to the embodiment of the present invention.

Provided next is the explanation about a computer system implemented as the translating apparatus according to the embodiment of the present invention. FIG. 3 shows an example of the translating apparatus implemented by a computer system according to the embodiment of the present invention.

In FIG. 3, a CPU 111, a memory 112, an input device 113, a display 114, and a disk device 115 are connected via a bus 110. For example, the input unit 2 is implemented by the input device 113, the original text displaying unit 1 is implemented by the display 114, and the original text storing unit 3 is implemented by the disk device 115. The translation range identifying unit 4, context processing unit 5, translation processing unit 6 and the context process range extending unit 7 are implemented by, for example, the CPU 111 and the memory 112.

Figure 4:
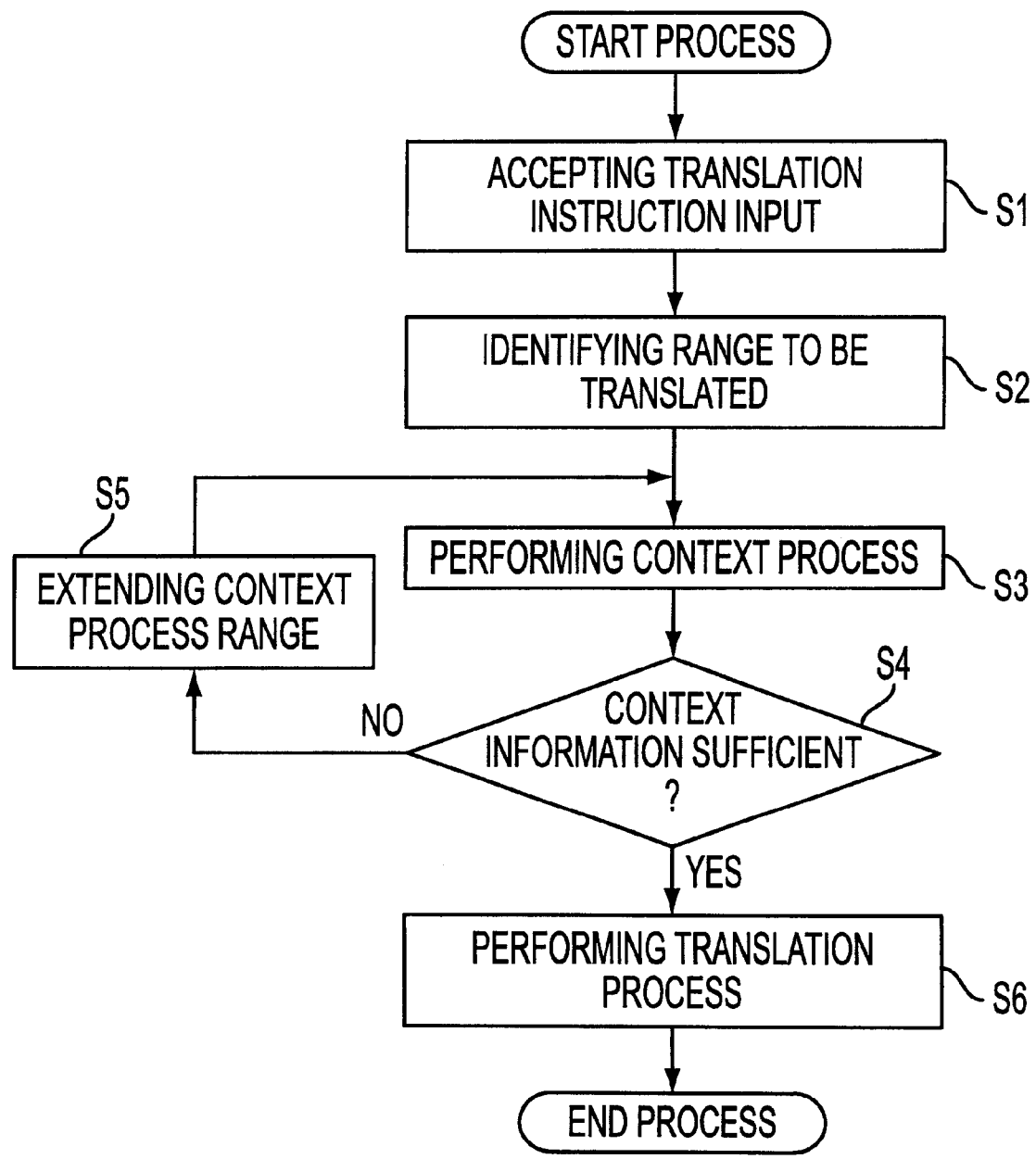
FIG. 4 is a flowchart showing operations performed by a translating apparatus according to a first embodiment of the present invention.

Provided next is the explanation about operations performed by the translating apparatus according to the embodiment of the present invention, by referring to the drawings. FIG. 4 is a flowchart showing the operations performed by the translating apparatus according to the embodiment of the present invention.

In FIG. 4, a translation operator inputs a translation instruction to an input unit 2, and the input unit 2 accepts the translation instruction in step S1.

In step 2, the translation range identifying unit 4 identifies a sentence to be translated in a document to be translated according to the translation instruction input to the input unit 2.

In step S3, a context processing unit 5 performs a context process for the sentence to be translated identified by the translation range identifying unit 4 to extract context information.

In step S4, it is determined whether or not the context information extracted in step S3 is sufficient for performing a translation process by the translation processing unit 6. If the context information is insufficient for the translation process, the process goes to step S5.

Then, in step S5, a context process range extending unit 7 extends a context process range where the context process will be performed, beyond a sentence to be translated, and passes the original text in the extended context process range to a context processing unit 5.

If it is determined that the context information is sufficient for performing the translation process in step S4, the context processing unit 5 passes sufficient context information for performing the translation process as well as the document including the sentence to be translated identified by the translation range identifying unit 4, to the translation processing unit 6. Then, the process goes to step S6.

In step S6, the translation processing unit 6 translates the sentence to be translated included in the document to be translated, based on the context information passed from the context processing unit 5.

As described above, by separately setting a range to be translated and a context process range in original text, context outside the range to be translated can be referenced even if only a portion of a document is specified as a range to be translated. As a result, the portion of the document can be translated efficiently and accurately.

Provided next is the explanation about a context process according to the first embodiment of the present invention, by referring to the drawings. The context process according to the first embodiment of the present invention is intended to estimate a field. Note that the following explanation is based on the assumption that a document to be translated includes sentences, each of which terminates in one line and is numbered.

Provided first is the explanation about an example of translating English text into the equivalent Japanese.

As shown in FIG. 5, an original text displaying unit 1 is assumed to display an original sentence numbered 31 "The talks were held in the Upper House.", and an original sentence numbered 32 "This has forced the party to change its stance."

A translation operator inputs the number of a desired sentence to be translated to an input unit 2, and issues a translation instruction. If the translation operator specifies the sentence numbered 32, the original sentence numbered 32 "This has forced the party to change its stance." will be a translation target.

Then, the context processing unit 5 performs a context process for the original sentence numbered 32. In the context process, a dictionary is consulted for each original word included in the original sentence numbered 32. As a result of consulting the dictionary, the translated word "これ" is selected for the original word "This"; the translated word "強制した" is selected for the original word "forced"; the translated word "パーティ" or "政党" is selected for the original word "party"; the translated word "変える" is selected for the original word "change"; the translated word "その" is selected for the original word "its"; and the translated word "姿勢" or "スタンス" is selected for the original word "stance", as shown in FIG. 6.

Furthermore, the original word "has" is recognized as an auxiliary verb, the original word "the" is recognized as a definite article, and the original word "to" is recognized as a function word.

Since there are a plurality of candidates for the original words "party" and "stance", a suitable translated word must be selected using a context process. In the meantime, there is only one translated word corresponding to each of the original words "This", "forced", "change", and "its". Accordingly, a Japanese equivalent for each of the original words is determined.

Then, field estimation is made in order to select a suitable translated word for each of the original words "party" and "stance".

FIG. 7 shows a correspondence table between the translated words of each of the original words "party" and "stance" and the corresponding fields.

In FIG. 7, if the Japanese word "パーティ" is selected as a translated word of the original word "party", the original sentence indicates a "general" field. If the translated word "政党" is selected as a translated word of the original word "party", the original sentence indicates a "political" field.

Furthermore, if the word "姿勢" is selected as a translated word of the original word "stance", the original sentence indicates the "general" field. Or, if the word "スタンス" is selected as a translated word of the original word "stance", the original sentence indicates a "sports" field. Note that the "general" field indicates a word available for all fields.

Accordingly, since the "political" and "sports" fields are candidates for the fields of the original words "party" and "stance" for which a translated word must be selected, a corresponding field cannot be determined uniquely.

As a result, if field estimation is made within a range of the original sentence numbered 32, this range includes no translated word indicating the political field or the sports field only. Therefore, a suitable translated word cannot be determined uniquely for each of the original words "party" and "stance".

If context cannot be determined in a range to be translated included in the original text, a context process range is extended in order to analyze context beyond the context process range of the original sentence to be translated.

Assume that a sentence preceding the sentence to be translated shown in FIG. 5 is added to the context process range. That is, the context process range extending unit 7 extracts the original sentence numbered 31 "The talks were held in the Upper House.", and passes the extracted sentence to the context processing unit 5.

The context processing unit 5 which receives the original sentence numbered 31, consults a dictionary for each original word of this sentence. As a result, a compound "Upper House" is retrieved from the original sentence numbered 31. Since the compound "Upper House" indicates the "political" field only, it is determined that the original sentence to be translated includes context related to the political field. Note that context information other than field information can be also extracted from the original sentence numbered 31.

As a result of the context process in the extended context process range, sufficient context related to the original sentence to be translated can be obtained. This context information is therefore passed to the translation processing unit 6 to perform the translation process.

Then, the translation processing unit 6 performs the translation process according to the context information, that is, the political field. The word "政党" used in the political field is selected as a translated word of the original word "party". In addition, the translated word "スタンス" used in the sports field is deleted, and the translated word "姿勢" available for all fields is selected.

As a result, the translated sentence "これは、政党にその姿勢を変えることを強制した。" can be obtained for the original sentence numbered 32 "This has forced the party to change its stance."

Provided next is the explanation about an example of translating English text into the equivalent French.

As shown in FIG. 5, the original text displaying unit 1 is assumed to display the original sentence numbered 31 "The talks were held in the Upper House.", and the original sentence numbered 32 "This has forced the party to change its stance.".

A translation operator inputs a number of a sentence to be translated to the input unit 2, and issues a translation instruction. Assuming that the translation operator specifies the sentence number 32, the original sentence numbered 32 "This has forced the party to change its stance." will be a translation target.

The context processing unit 5 then performs a context process for the original sentence numbered 32. With the context process, a dictionary is consulted for each of the original words included in the original sentence numbered 32. As a result of consulting the dictionary: a translated word "Ceci" is selected for the original word "This"; a translated word "a" is selected for the original word "has"; a translated word "forcé" is selected for the original word "forced"; a translated word "la" is selected for the original word "the"; a translated word "parti" or "groupe" is selected for the original word "party"; a translated word "à" is selected for the original word "to"; a translated word "changer" is selected for the original word "change"; a translated word "sa" is selected for the original word "its"; and a translated word "position" is selected for the original word "stance", as shown in FIG. 8.

Since there are a plurality of candidates for the original word "party", a suitable translated word must be selected with the context process. In the meantime, there is only one equivalent for the original words "This" "has", "forced", "the", "to", "change", "its", and "stance". Accordingly, a translated word for each of the original words is determined uniquely.

Then, field estimation is made for selecting a suitable translated word for the original word "party".

FIG. 9 shows a correspondence table between a translated word of the original word "party" and a field where the translated word is used.

In FIG. 9, if a word "parti" is selected as a translated word of the original word "party", the original sentence indicates the "political" field. Or, if the word "groupe" is selected as the translated word of the original word "party", the original sentence indicates the "general" field. The "general" field indicates a word available for all fields.

That is, the "political" and "general" fields will be candidates for the field of the original word "party" for which a translated word must be selected. Therefore, a corresponding field cannot be determined uniquely.

Therefore, even if the field estimation is made within a range to be translated in the original sentence numbered 32, this range includes no translated word indicating the political field only. As a result, a suitable translated word cannot be uniquely determined for the original word "party".

If context cannot be determined within a range to be translated in desired original text, a context process range is extended for analyzing the context beyond the range to be translated in the desired original text.

Assume that a sentence preceding the sentence to be translated is added to the context process range in FIG. 5. That is, the context process range extending unit 7 extracts the original sentence numbered 31 "The talks were held in the Upper House.", and passes the extracted sentence to the context processing unit 5.

The context processing unit 5 which receives the original sentence numbered 31, consults a dictionary for each original word of the sentence numbered 31. As a result, the compound "Upper House" is retrieved from the original sentence numbered 31. Since the compound "Upper House" indicates the "political" field only, it is determined that the original sentence to be translated includes context related to the political field. Note that context information other than field information can be also extracted from the original sentence numbered 31.

As a result of the context process performed for the extended context process range, sufficient context related to the original sentence to be translated can be obtained. Therefore, this context information is passed to the translation processing unit 6 in order to perform a translation process.

Then, the translation processing unit 6 performs the translation process based on the context information, that is, the political field. The word "parti" used in the political field is selected as a translated word of the original word "party".

As a result, a translated sentence "Ceci a forcé la parti á changer sa position." can be obtained for the original sentence "This has forced the party to change its stance."

As described above, even if there is no translated word identifying a field in a range to be translated, the field can be identified from context outside the range to be translated. Therefore, a suitable translation process depending on a field can be performed.

Provided next is the explanation about a context process according to the second embodiment of the present invention, by referring to the drawings. This context process is intended to estimate a document type.

As a document type, a political article, thesis, operating manual, etc. can be specified. Translation is sometimes performed in a "da/dearu" tone, or performed without using a personal pronoun, depending on a document type.

FIG. 10 shows a correspondence table between a field and a document type when English text is translated into Japanese text. In this figure, if the original text is a political article, translation is performed in a "da/dearu" tone, and in a passive voice. If the original text is an operating manual, translation is performed in a "desu/masu" tone, and in an imperative form. Here, the imperative form and the passive voice are default expressions of translated text corresponding to an English expression such as "must be", etc.

For example, the field of the original text shown in FIG. 5 is the political field. Accordingly, the context processing unit 5 references the column of the political article shown in FIG. 10, and instructs the translation processing unit 6 to translate the article in the "da/dearu" tone and in a passive voice.

The translation processing unit 6 receives document type information as well as other context information from the context processing unit 5, and performs the translation process.

As described above, even if a range to be translated includes no expression identifying a document type, it can be identified based on context outside the range to be translated by estimating a document type. As a result, a suitable translation process depending on a document type can be performed.

Provided next is the explanation about a context process according to the third embodiment of the present invention, by referring to the drawings. This context process is intended to complete an abbreviation.

The original text displaying unit 1 is assumed to display the original text "In the last election, the Japan Socialist Party (JSP) enjoyed victory. The reason for JSP's victory was . . . ".

A translation operator instructs the input unit 2 to translate the sentence beginning with "The reason . . . " as a sentence to be translated.

Then, the context processing unit 5 performs a context process for this sentence. With the context process, a dictionary is consulted for each of the words included in the sentence beginning with "The reason . . . ". As a result of consulting the dictionary, the word "JSP" is recognized as an unregistered word.

The meaning of the unregistered word "JSP" cannot be determined according to this sentence only.

Therefore, if context cannot be determined within a range to be translated in original text to be translated, a context process range in the original text to be translated is extended in order to analyze the context beyond the range to be translated in the original text to be translated.

Assume that a sentence preceding the sentence to be translated is added to the context process range. That is, the context process range extending unit 7 extracts the original sentence "In the last election, the Japan Socialist Party (JSP) enjoyed victory.", and passes the extracted sentence to the context processing unit 5.

The context processing unit 5 makes a comparison between the original sentence "In the last election, the Japan Socialist Party (JSP) enjoyed victory." and the sentence to be translated including the unregistered word "JSP".

As a result, the unregistered word "JSP" is determined as an abbreviation of the proper noun "Japan Socialist Party".

To make such a comparison, factors such as that each of the words in the proper noun "Japan Socialist Party" begins with an uppercase letter, that the words beginning with the uppercase letters are in sequence, and that the abbreviation "JSP" generated by combining only the uppercase letters of the respective words is included, are used.

As described above, the meaning of the abbreviation can be clarified according to context of a neighborhood.

As a result of the context process performed in the extended context process range, the meaning of the abbreviation can be identified. Therefore, the result of the identification is passed to the translation processing unit 6 to perform a translation process.

The translation processing unit 6 then performs the translation process by using a translated word of the noun "Japan Socialist Party" as that of "JSP".

As a result, the original sentence is translated as "JPS 強制した . . . " if t he context process is not performed. In the meantime, the sentence is translated as "パーティ, 強制した . . . " if the context process is performed. That is, a translated sentence that is easy to read can be obtained.

Figure 11:
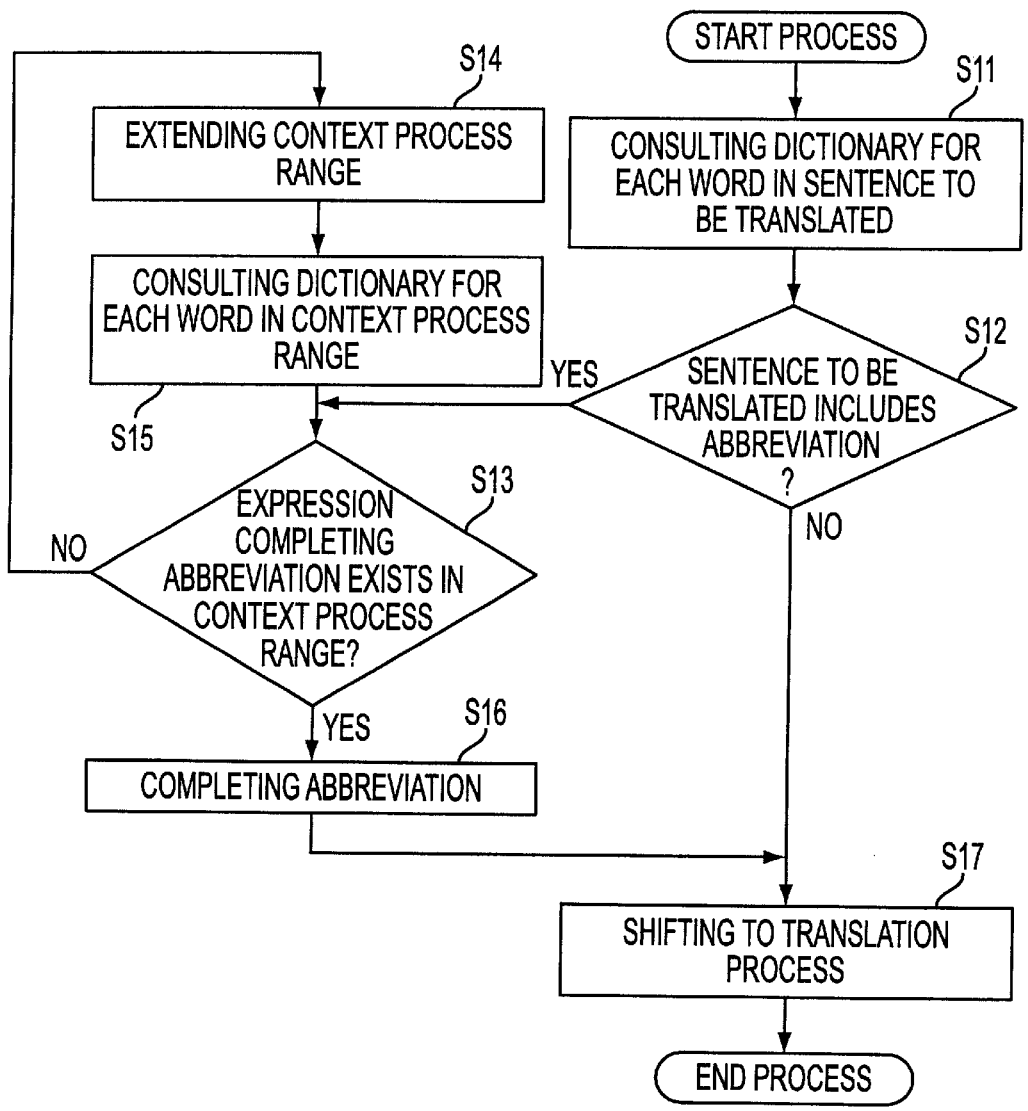
FIG. 11 is a flowchart showing operations performed in a context process according to a third embodiment of the present invention.

FIG. 11 is a flowchart showing a context process according to the third embodiment of the present invention.

In FIG. 11, the context processing unit 5 consults a dictionary for each word included in a sentence to be translated in step S11.

Then, it is determined whether or not an abbreviation is included in the sentence to be translated in step S12. If "YES", the process goes to step S13.

In step S13, it is determined whether or not an expression which completes the abbreviation exists in a context process range. If "NO", the process goes to step S14.

In step S14, the context process range extending unit 7 extends the context process range.

The context processing unit 5 then consults a dictionary for each word included in a sentence in the extended context process range in step S15. After that, the process goes back to step S13.

If it is determined that the expression which completes the abbreviation exists in the context process range in step S13, the process goes to step S16.

In step S16, the abbreviation is completed in the sentence to be translated according to the expression which completes the abbreviation in the context process range.

In step S17, the translation processing unit 6 performs a translation process in consideration of the completed form of the abbreviation.

In the meantime, if there is no abbreviation in the sentence to be translated in step S12, the process skips to step S17 to perform a translation process without considering a completion of the abbreviation.

As described above, even if a range to be translated includes no complete form of an abbreviation, it can be retrieved from context outside the range to be translated by estimating the abbreviation. As a result, a translation process can be performed with completion of the abbreviation, depending on need.

Provided next is the explanation about a context process according to the fourth embodiment of the present invention, by referring to the drawings. This context process is intended to identify a reference destination.

Assume that the original text displaying unit 1 displays the original text "In the last election, the Japan Socialist Party enjoyed victory. The reason for its victory was . . . ".

A translation operator instructs the input unit 2 to translate the sentence beginning with "The reason . . . " as a sentence to be translated.

Then, the context processing unit 5 performs a context process for this sentence. With the context process, a dictionary is consulted for each of the original words included in the sentence beginning with "The reason . . . ". As a result of consulting the dictionary, what the pronoun "its" indicates is determined as being indefinite.

What the pronoun "its" indicates cannot be determined from only the sentence to be translated which begins with "The reason . . . ".

Therefore, if context cannot be determined within a range to be translated in original text to be translated, a context process range is extended in order to analyze context beyond the range to be translated in the original text to be translated.

Assume that a sentence preceding the sentence to be translated is added to the context process range. That is, the context process range extending unit 7 extracts the original sentence "In the last election, the Japan Socialist Party enjoyed victory.", and passes the extracted sentence to the context processing unit 5.

The context processing unit 5 then performs a context process for the original sentence "In the last election, the Japan Socialist Party enjoyed victory." As a result, it is determined that the pronoun "its" included in the phrase "its victory" indicates the "Japan Socialist Party". This is because the winner of the "victory" is the "Japan Socialist Party".

The following paper refers to such a context process.

Source Document: Information Processing Society Study Report Natural Language Processing Study Report Issue Date: Nov. 19, 1993

Title of Paper: Context Processing System DIANA Using Context Restriction and Context Selection Number of Paper: 98-8

Author: Tetsuya Nasukawa

As described above, a reference destination can be clarified according to context of a neighborhood.

As a result of the context process performed in the extended context process range, the reference destination can be identified. Then, the result of the identification is passed to the translation processing unit 6 to perform a translation process.

Then, the translation processing unit 6 performs the translation process using the context information indicating that the pronoun "its" points to "the Japan Socialist Party", depending on need.

As a result, the phrase "its victory" is translated as "政党" if the context process is not performed. In the meantime, this phrase is translated as "変える" if the context process is performed. That is, a translated sentence which is easy to read can be obtained.

Figure 12:
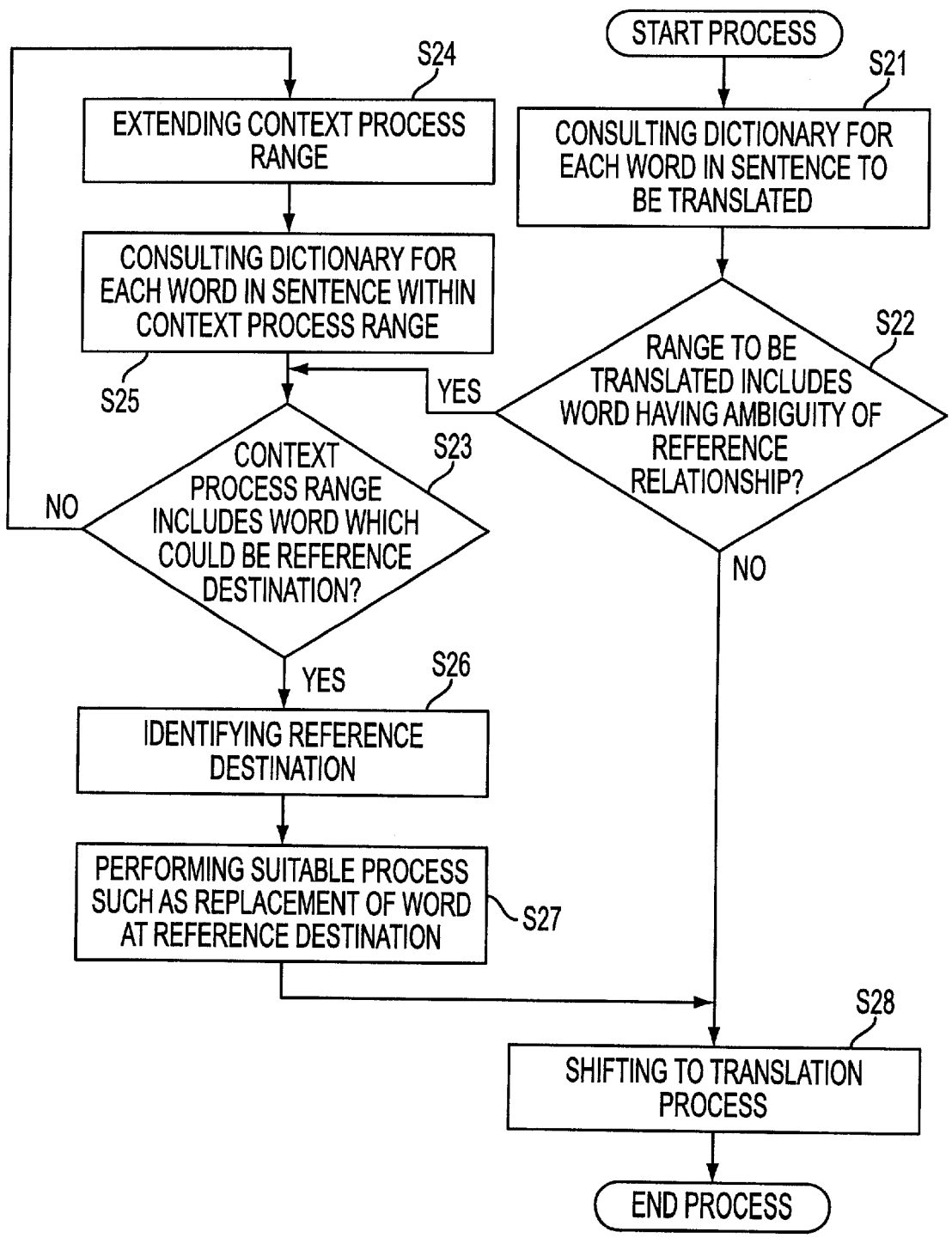
FIG. 12 is a flowchart showing operations performed in a context process according to a fourth embodiment of the present invention.

FIG. 12 is a flowchart showing a context process according to the fourth embodiment of the present invention.

In FIG. 12, the context processing unit 5 first consults a dictionary for each word in a sentence to be translated in step S21.

Then, it is determined whether or not there is a word having an ambiguous reference relationship in a range to be translated in step S22. If "YES", the process goes to step S23.

In step S23, it is determined whether or not a context process range includes a word or a word sequence which could possibly be a reference destination. If "NO", the process goes to step S24.

In step S24, the context process range extending unit 7 extends the context process range.

After the context processing unit 5 consults a dictionary for each word in a sentence in the extended context process range in step S25, the process goes to step S23.

If it is determined that the word or the word sequence could possibly be a reference destination in step S23, the process goes to step S26.

In step S26, the reference destination of the sentence in the extended context process range is identified.

In step S27, a process such as replacing the word having the ambiguous reference relationship in the range to be translated with a word at a reference destination, etc. is performed.

In step S28, the translation processing unit 6 performs a translation process in consideration of the word at the reference destination.

In step S22, if it is determined that the range to be translated includes no word having the ambiguous reference relationship, the process goes to step S28 to perform the translation process without considering the word at the reference destination.

As described above, even if a range to be translated includes no word pointed to by a demonstrative pronoun included in that range, a word pointed to by the demonstrative pronoun can be retrieved from context outside the range to be translated, by estimating a reference destination. As a result, a translation process can be performed while replacing a demonstrative pronoun, depending on need.

Provided next is the explanation about operations performed by the translation range identifying unit 4 included in the translating apparatus according to the first embodiment of the present invention, by referring to the drawings. This unit is intended to identify a sentence to be translated included in original text where one sentence does not terminate in one line, according to a position of a cursor 10.

Assume that the original text displaying unit 1 displays the original text "The talks were held in the Upper House. This has forced the party to change its stance.", as shown in FIG. 13.

In this case, the sentences do not terminate in one line, and they are also not numbered.

A translation operator operates the input unit 2 to move the cursor 10 to an arbitrary position of a sentence to be translated for specification.

Then, the translation range identifying unit 4 identifies the sentence to be translated. That is, this unit detects the position of the cursor 10, and automatically determines which portion the translation operator intends to translate according to the position of the cursor 10. Since translation is performed by sentence, the sentence pointed to by the cursor 10 is extracted.

For example, if the cursor is positioned at the character "e" as shown in FIG. 13, backward scanning is started from the character "e". Then, the word beginning with an uppercase letter "This" is searched. Since the period "." immediately follows the word "House" which immediately precedes the word "This", the word "This" is determined to be the beginning of the sentence in which the cursor 10 is positioned.

Then, forward scanning is performed from the character "e" at which the cursor 10 is positioned.

Since the period "." immediately follows the word "stance", this word is determined to be the last word of the sentence in which the cursor 10 is positioned.

As a result, the sentence "This has forced the party to change its stance" is determined as the sentence to be translated.

Then, the context processing unit 5 performs a context process for the original sentence "This has forced the party to change its stance.", which is identified by the translation range identifying unit 4. If context cannot be determined from this sentence only, the context process range extending unit 7 extends the context process range where the context process is performed, to the original sentence "The talks were held in the Upper House."

The translation processing unit 6 then performs a translation process based on the context information obtained by the context processing unit 5.

As a result, a translated sentence "これは、政党にその姿勢を変えることを強制した。" can be obtained for the original sentence "This has forced the party to change its stance."

Provided next is the explanation about operations performed by the translation range identifying unit 4 included in the translating apparatus according to the second embodiment of the present invention, by referring to the drawings. The translation range identifying unit 4 is intended to identify a range to be translated in original text where one sentence does not terminate in one line, according to shaded area 11 produced by dragging a mouse, etc.

Assume that the original text displaying unit 1 displays the original text "The talks were held in the Upper House. This has forced the party to change its stance.", as shown in FIG. 14.

In this case, the sentences do not terminate in one line, and they are also not numbered.

A translation operator operates the input unit 2, and produces a shaded area 11 in order to select a sentence to be translated.

Then, the translation range identifying unit 4 identifies the sentence to be translated. That is, the translation range identifying unit 4 detects the range of the shaded area 11, and automatically determines which portion the translation operator intends to translate according to the shaded area 11.

For example, if the shaded area 11 is made over the range "The talks were held in the Upper House. This has forced the party to change" in FIG. 14, it is determined whether or not the beginning of the range contained in the shaded area 11, is the beginning of a sentence. Since the word beginning with the uppercase letter "The" is located at the beginning, this word is determined as the beginning of the sentence.

Then, forward scanning is started from the word "The" in order to detect a termination of the sentence. Since the period "." exists between the word "House" and the word "This", it is determined that the termination of the sentence exists between the words "House" and "This".

The forward scanning finally reaches the last word "change" in the selected range of the shaded area 11, without detecting an additional termination of a sentence other than the above described termination, as a result of continuing the forward scanning.

Then, it is determined whether or not the last word "change" is the end of the sentence. Since there is no period "." immediately after the last word "change", the last word "change" is not determined as the end of the sentence.

Accordingly, the range from the most recently detected termination to the last word "change" is determined as being incomplete, and the range "This has forced the party to change." is removed from the range selected by the shaded area 11.

As a result, the sentence "The talks were held in the Upper House." is determined as the sentence to be translated.

The above described embodiment refers to the case where a sentence is completely included in the range selected by the shaded area 11. However, a sentence partially included in a range selected by the shaded area 11 may also be a sentence to be translated.

Then, the context processing unit 5 performs a context process for the original sentence "The talks were held in the Upper House.", which is identified by the translation range identifying unit 4. If context cannot be determined based on only this sentence, the context process range extending unit 7 extends a context process range where the context process is performed.

The translation processing unit 6 then performs a translation process based on context information obtained by the context processing unit 5.

As a result, a translated sentence "その姿勢" can be obtained for the original sentence "The talks were held in the Upper House.".

As described above, a sentence to be translated can be extracted by being suitably identified, thereby performing a translation process accurately.

Furthermore, a group of sentences to be translated is identified, thereby performing a translation process accurately.

Provided next is the explanation about a method for processing an inline tag performed by the translating apparatus according to the first embodiment of the present invention, by referring to the drawings. This method is intended to detect an inline tag and ignore it as a non-target in a range to be translated, if the inline tag of a markup language, etc. exists in original text.

Figure 15:
FIG. 15 shows an example of original text into which inline tags are input to the translating apparatus according to the first embodiment of the present invention.

Assume that the original text displaying unit 1 displays the original sentence "This is <B>a </B>pen.", as shown in FIG. 15. In this case, "<B>" and "</B>" are inline tags used to emphasize the indefinite article "a".

A translation operator operates the input unit 2, moves a cursor 41 to a character "i", and issues a translation instruction.

The translation range identifying unit 4 then identifies a sentence to be translated. That is, this unit detects the position of the cursor 41, and automatically determines which portion the translation operator intends to translate, according to the position of the cursor 41. Since translation is performed by sentence, a sentence where the cursor 41 is positioned is extracted.

For example, since the cursor 41 is positioned at the character "i", backward scanning is started from the character "i". Then, the word beginning with an uppercase letter "This" is located in FIG. 15, and this word is determined as the beginning of the sentence where the cursor 41 is positioned.

Then, forward scanning is started from the character "i" at which the cursor 41 is positioned. Then, the inline tags "<B>" and "</B>" are detected using an interpreter of a markup language. The detected inline tags are ignored as a non-target of translation. Since the period "." immediately follows the word "pen" as a result of continuing the forward scanning, the word "pen" is determined as the last word in the sentence in which the cursor 41 is positioned.

As a result, the sentence "This is a pen." is determined as the sentence to be translated.

Then, the context processing unit 5 performs a context process for the original sentence "This is a pen.", which is identified by the translation range identifying unit 4. If context cannot be determined according to only the original sentence "This is a pen.", the context process range extending unit 7 extends a context process range where the context process is performed.

The translation processing unit 6 then performs a translation process based on the context information obtained by the context processing unit 5.

As a result, a translated sentence "スタンス" can be obtained for the original sentence "This is a pen.".

As described above, a portion unrelated to translation can be removed by ignoring an inline tag, thereby a translation process can be performed accurately.

Provided next is the explanation about a method for processing an inline tag performed by the translating apparatus according to the second embodiment of the present invention, by referring to the drawings. This method is intended to detect an inline tag, and ignore it as a non-target in a context process range to be extended, if the inline tag of a markup language, etc. is included in original text.

Figure 16:
FIG. 16 shows an example of original text into which inline tags are input to the translating apparatus according to the second embodiment of the present invention.

Assume that the original text displaying unit 1 displays the original text "This is <B>a </B>pen. And that is a book." is displayed, as shown in FIG. 16. Here, "<B>" and "</B>" are inline tags used to emphasize the indefinite article "a".

The translation operator operates the input unit 2, moves a cursor 42 to a character "b", and issues a translation instruction.

The translation range identifying unit 4 identifies a sentence to be translated. The translation range identifying unit 4 detects the position of the cursor 42, and automatically determines which portion the translation operator intends to translate, according to the position of the cursor 42. Since translation is performed by sentence, the sentence where the cursor 42 is positioned is extracted.

Since the cursor 42 is positioned at the character "b" in FIG. 16, backward scanning is started from this character. The word "And" which begins with an uppercase letter is located as a result of the scanning, and this word is determined to be the beginning of the sentence in which the cursor 42 is positioned.

Then, forward scanning is started from the character "b" at which the cursor 42 is positioned. Since the period "." immediately follows the word "book", this word is determined to be the last word of the sentence in which the cursor 42 is positioned.

As a result, the sentence "And that is a book. " is determined as a sentence to be translated.

The context processing unit 5 performs a context process for the original sentence "And that is a book.", which is identified by the translation range identifying unit 4. If context cannot be determined according to only the original sentence "And that is a book.", the context process range extending unit 7 extends a context process range where the context process is performed.

If the context process range is extended to a sentence immediately preceding the original sentence "And that is a book.", backward scanning is started from the word "pen". The inline tags "<B>" and "</B>" are detected using an interpreter of a markup language, and these tags are removed from the context process range as a non-targets in the extended context process range. The word "This" which begins with an uppercase letter, is located as a result of continuing the backward scanning, and determined to be the beginning of the sentence in the context process range.

As a result, the original sentence "This is a pen." is added to the context process range, and the context processing unit 5 detects context information from the extended context process range.

The translation processing unit 6 then performs a translation process based on the context information obtained by the context processing unit 5.

As a result, a translated sentence "そして、これは本です。" is obtained for the original sentence "And that is a book."

As described above, a portion unrelated to context can be removed by removing an inline tag from a context process range, thereby performing a context process accurately.

Provided next is the explanation about a method for extending a context process range performed by the translating apparatus according to the first embodiment of the present invention. This method is intended to extend a context process range sentence by sentence, backwards and forwards until required context can be obtained.

In FIG. 5, if context information cannot be obtained from only the original sentence numbered 32 "This has forced the party to change its stance.", the context process range is extended to a sentence immediately preceding or succeeding the original sentence numbered 32.

If required context cannot be obtained even though the context process range is extended to the sentence immediately preceding or succeeding the sentence to be translated, the context process range extending unit 7 further extends the context process range to sentences preceding or succeeding the sentence to be translated until the required context can be obtained. The method for extending a context process range by sentence backwards and forwards is helpful for examining a correspondence where an interval between sentences is an important factor, etc.

If a sentence including required context is separate from a sentence to be translated, a context process range may be extended to before and after the sentence to be translated in units of a plurality of sentences.

As described above, by extending a context process range sentence by sentence, a context process such as estimating an abbreviation, estimating a reference destination, etc. can be performed efficiently, thereby translating a portion of a document efficiently and accurately.

Provided next is the explanation about a method for extending a context process range performed by the translating apparatus according to the second embodiment of the present invention, by referring to the drawings. This method is intended to extend the context process range in paragraphs before or after a sentence to be translated until required context can be obtained.

Figure 17A:
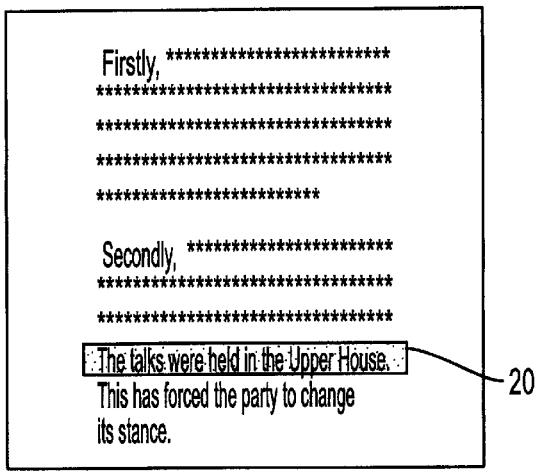
FIGS. 17A to 17C show a method for extending a context process range by the translating apparatus according to the second embodiment of the present invention.

As shown in FIG. 17A, the original text displaying unit 1 is assumed to display original text, and shaded area 20 is made in a sentence to be translated "The talks were held in the Upper House." included in the original text.

The context processing unit 5 performs a context process for the sentence to be translated in which the shaded area 20 is made. If sufficient context information cannot be obtained from the shaded sentence as a result of the context process, the context process range extending unit 7 extends the context process range to an entire paragraph including the sentence to be translated.

Figure 17B:
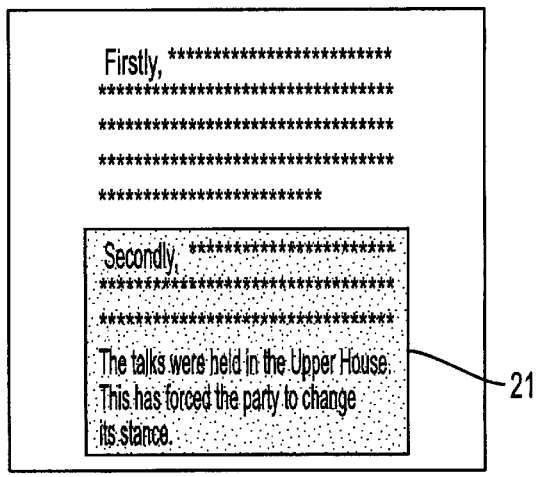

That is, the context process range extending unit 7 specifies the text contained in the shaded area 21 is made "Secondly, . . . The talks were held in the Upper House. This has forced the party to change its stance.", as a context process range, as shown in FIG. 17B.

To identify the paragraph as the context process range, backward scanning is started from the shaded original sentence to be translated in order to check to see if any sentence exists. A sentence which begins with "Secondly," is determined to precede the sentence to be translated where the shaded area 20 is made. Then, it is determined whether or not the sentence beginning with "Secondly," is the beginning of the paragraph. Since this sentence is indented and an empty line exists between the preceding sentence beginning with "Firstly" and this line, it is determined to be the first sentence of the paragraph.

Next, forward scanning is started from the sentence to be translated where the shaded area 20 is made, in order to check to see if any sentence exists. The sentence "This has forced the party to change its stance." follows the shaded sentence to be translated. Then, it is determined whether or not the detected sentence is the last sentence of the paragraph. Since no sentence immediately follows this sentence in the same line; there is an empty line between the succeeding sentence and this sentence; and the next sentence is indented, the sentence "This has forced the party to change its stance." is determined to be the last sentence of the paragraph.

With the above described method, the context process range after extension is identified by detecting the first and the last sentences of a paragraph.

Then, the context processing unit 5 extracts context information from the context process range contained in the shaded area 21 is made, as shown in FIG. 17B. If sufficient context information cannot be obtained from the context process range contained in the shaded area 21 is made, the context process range extending unit 7 extends the context process range to the entire text of the next paragraph.

Figure 17C:
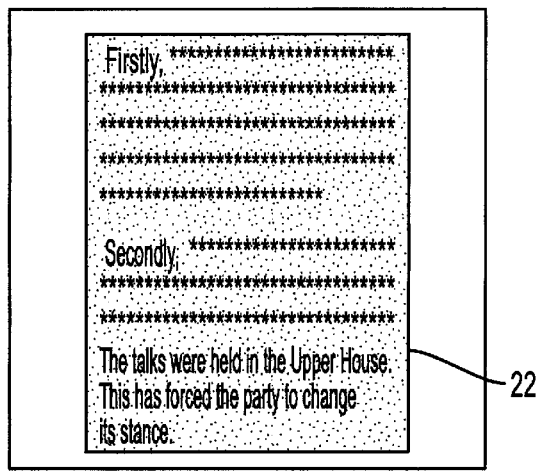

Assume that the context process range extending unit 7 extends the context process range to the entire text of the preceding paragraph, as shown in FIG. 17C, and adds the sentence which begins with "Firstly," to the context process range. As a result, the text contained in the shaded area 22 is made "Firstly, . . . , secondly, . . . The talks were held in the Upper House. This has forced the party to change its stance." is specified as the context process range.

The context processing unit 5 extracts context information from the context process range contained in the shaded area 22, as shown in FIG. 17C. If sufficient context information is extracted from the context process range contained in the shaded area 22, the context processing unit 5 passes the extracted context information to the translation processing unit 6.

The translation processing unit 6 translates the sentence to be translated where the shaded area 20 is made, based on the context information passed from the context processing unit 5.

Note that the method for extending a context process range in paragraphs backwards and forwards is helpful for making a field determination where the existence/non-existence of a word identifying that a specific field exists is important.

If a sentence including required context is separate from a sentence to be translated, a context process range may be extended before or after the sentence to be translated in units of a plurality of paragraphs.

As described above, a context process range is extended in paragraphs corresponding to a range to be translated until a translated sentence can be determined for an original sentence. Accordingly, a context process such as estimating a field, estimating a document type, etc. can be performed efficiently, thereby translating a portion of a document efficiently and accurately.

Provided next is the explanation about the method for extending a context process range performed by the translating apparatus according to the third embodiment of the present invention, by referring to the drawings. This method is intended to change the method for extending a context process range depending on a required type of context process.

FIG. 18 shows a correspondence table between a type of context process and the method for extending a context process range. This table is pre-stored in the context process range extending unit 7.

In FIG. 18, when field estimation is made, a context process range is extended in paragraphs before or after a sentence to be translated.

When document type estimation is made, the context process range is extended in paragraphs before or after the sentence to be translated.

To complete an abbreviation, the context process range is extended in sentences before or after the sentence to be translated.

In the meantime, to refer to a reference destination, the context process range is extended in sentences before the sentence to be translated.

Figure 19:
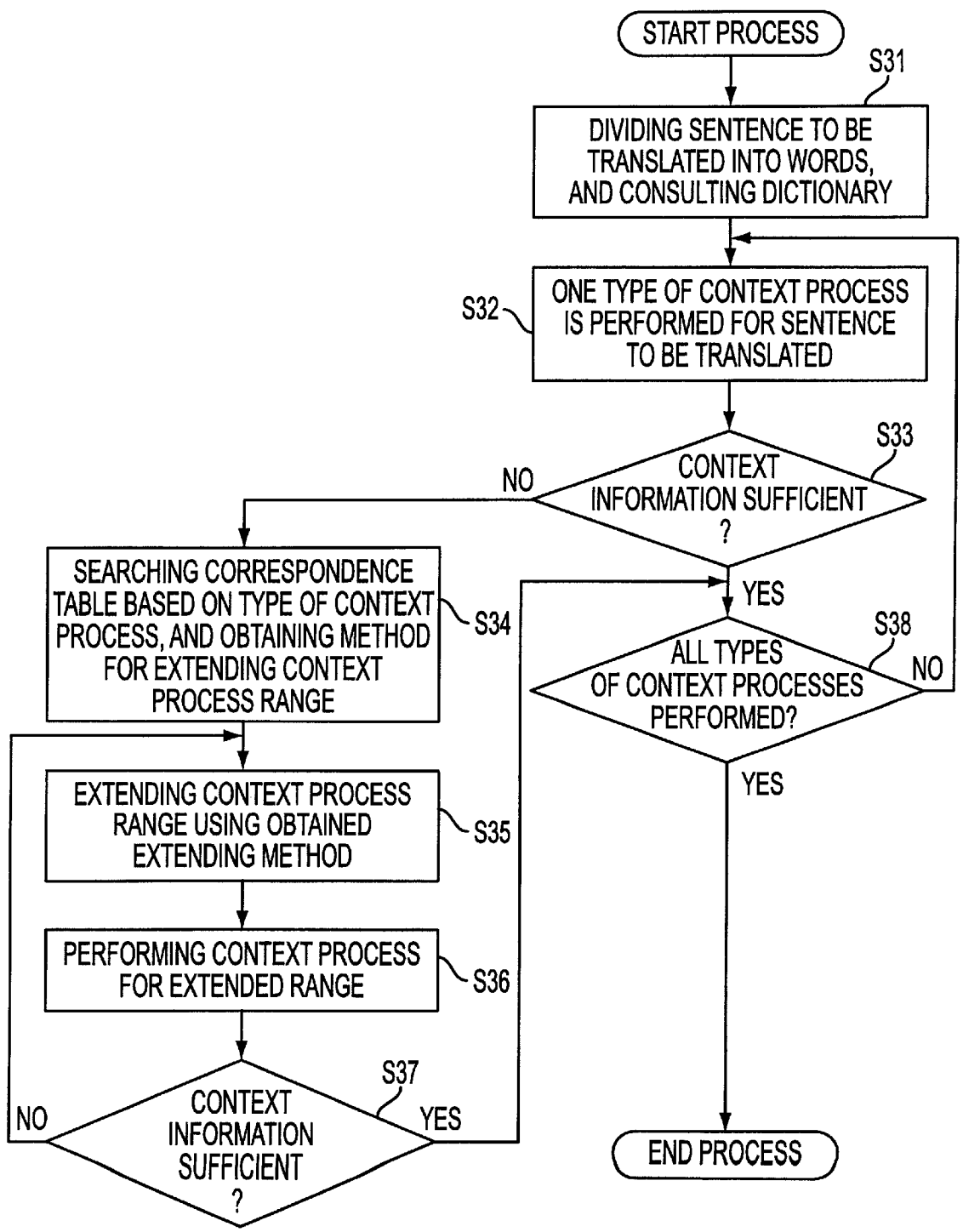
FIG. 19 is a flowchart showing the method for extending a context process range according to the third embodiment of the present invention.

FIG. 19 is a flowchart showing the method for extending a context process range performed by the translating apparatus according to the third embodiment of the present invention.

In FIG. 19, the context processing unit 5 consults a dictionary for each word included in a sentence to be translated in step S31.

Then, one type of context process is selected for the sentence to be translated, and the selected context process is performed in step S32.

In step S33, it is determined whether or not sufficient context information can be obtained from a range to be translated. If "NO", the process goes to step S34.

In step S34, the correspondence table shown in FIG. 18 is referenced to obtain a method for extending a context process range according to the selected type of context process. If the type of context process is a field estimation or document type estimation, the context process range is extended in paragraphs before or after the sentence to be translated. If the type of context process is completion of an abbreviation, the context process range is extended in sentences before or after the sentence to be translated. If the type of context process is referring to a reference destination, the context process range is extended in sentences before the sentence to be translated.

In step S35, the context process range extending unit 7 extends the context process range based on the method for extending a context process range obtained in step S34.

The context processing unit 5 then performs a context process for text in the extended context process range in step S36.

In step S37, the context processing unit 5 determines whether or not sufficient context information can be obtained from the extended context process range. If "NO", the process goes to step S35 to repeatedly extend the context process range.

If it is determined that sufficient context information can be obtained from the extended context process range, the process goes to step S38.

The context processing unit 5 determines whether or not all types of context processes have been performed in step S38. If "NO", the process goes to step S32 to perform a next type of context process, and completes the process after all types of context processes have been performed.

If it is determined that sufficient context information can be obtained from the context process range in step S33, the process goes to step S38.

As described above, a context process can be efficiently performed by determining a direction in which a context process range is extended based on a type of context process, thereby translating a portion of a document efficiently and accurately.

Additionally, a context process for estimating a reference destination can be efficiently performed by extending a context process range in sentences in a backward direction, thereby translating a portion of a document efficiently and accurately.

Furthermore, a context process can be performed in a context process range having a context corresponding to a range to be translated by terminating extension of the context process range at a boundary of the context, thereby performing the context process accurately and quickly.

Provided next is the explanation about a method for dividing a range to be translated performed by the translating apparatus according to the first embodiment of the present invention. This method is intended to perform translation by dividing the range to be translated for each paragraph, if the range to be translated straddles a plurality of paragraphs. This is also because context may change at a change of paragraph.

That is, if the last sentence of a paragraph A and the first sentence of a paragraph B are simultaneously specified as sentences to be translated by a process of dragging a mouse, etc., the last sentence of the paragraph A and the first sentence of the paragraph B are scanned when a context process is performed. Then, it is detected that these sentences respectively belong to different paragraphs, so that the range to be translated is determined to straddle the plurality of paragraphs.

Then, a translation process is respectively performed for the last sentence of the paragraph A and the first sentence of the paragraph B that are determined to straddle the plurality of paragraphs.

As a result, the last sentence of the paragraph A can be translated based on only the context of the paragraph A, while the first sentence of the paragraph B can be translated based on only the context of the paragraph B. Accordingly, even if a topic suddenly changes at the change of paragraph from A to B, translation can be performed accurately.

Assuming that a topic of baseball changes to the one such as the weather of the next day, means of transportation to a baseball ground, etc., a translation process can be performed for respective fields such as a baseball field, a weather field, and a transportation field, thereby performing the translation process accurately.

As described above, context corresponding to a range to be translated can be accurately extracted by dividing the range into paragraphs, even if a topic suddenly changes at a change to a next paragraph. As a result, a translation process can be performed accurately.

Provided next is the explanation about a method for dividing a range to be translated, performed by the translating apparatus according to the second embodiment of the present invention. This method is intended to divide a range to be translated for each paragraph, and set each context process range for each of the divided ranges to be translated for each of the paragraphs. This is because context may often change as a paragraph changes.

If the last sentence of the paragraph A and the first sentence of the paragraph B are simultaneously specified as sentences to be translated by a process of dragging a mouse, etc., these sentences are scanned when a context process is performed. Then, it is detected that these sentences respectively belong to different paragraphs, so that the range to be translated is determined to straddle the plurality of paragraphs.

A translation process is then performed respectively for the last sentence of the paragraph A and the first sentence of the paragraph B that are determined to straddle the plurality of paragraphs.

If sufficient information cannot be obtained from the last sentence of the paragraph A when a translation process is performed for the last sentence of the paragraph A, a context process range is extended based on only the last sentence of the paragraph A. Then, context information is extracted from the extended context process range, and the last sentence of the paragraph A is translated.

In the meantime, if sufficient context information cannot be obtained from the first sentence of the paragraph B, a context process range is extended based on only the first sentence of the paragraph B. Then, context information is extracted from the extended context process range, and the first sentence of the paragraph B is translated.

That is, the last sentence of the paragraph A can be translated independently from the first sentence of the paragraph B, and the first sentence of the paragraph B can be translated independently from the last sentence of the paragraph A. Therefore, even if a topic suddenly changes at the change of paragraph from A to B, translation can be performed accurately.

As described above, context corresponding to a context process range can be accurately extracted by setting a context process range for each divided range to be translated for each paragraph, when a topic changes at a change of paragraph.

Provided next is the explanation about a method for displaying context information according to the first embodiment of the present invention, by referring to the drawings. This method is intended to display context information determined and obtained by a context process, at the side of a sentence to be translated.

Figure 20:
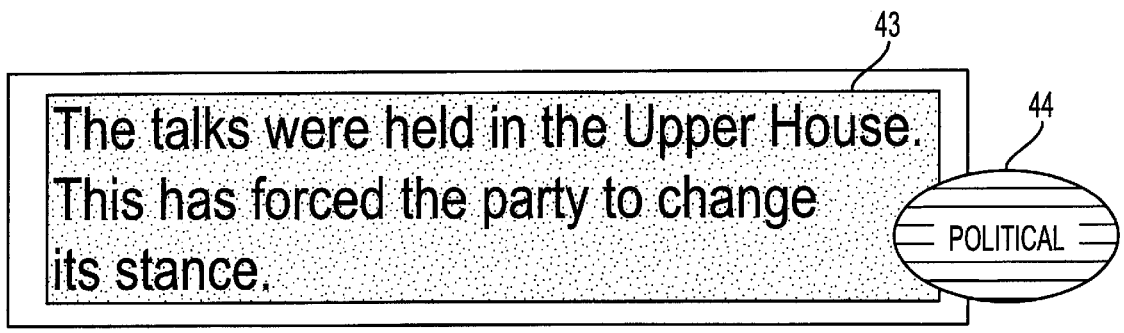
FIG. 20 shows a state where context information is displayed for original text input to the translating apparatus according to the first embodiment of the present invention.

Assume that the original text displaying unit 1 displays the original text "The talks were held in the Upper House. This has forced the party to change its stance.", as shown in FIG. 20.

A shaded area 43 is made for a sentence to be translated, which is identified by the translation range identifying unit 4.

Then, the context processing unit 5 performs a context process for the sentence to be translated, and detects a compound "Upper House" from the sentence to be translated in which the shaded area 43 is made. Since the compound "Upper House" is used in a political field only, it is determined that the sentence to be translated in which the shaded area 43 is made, relates to the political field.

Next, the original text displaying unit 1 displays context information 44 extracted by the context processing unit 5 from the sentence to be translated, at the side of the sentence to be translated. Since the sentence to be translated in which the shaded area 43 is made, for example, relates to the political field, a word "political" is displayed as context information 44.

As a result, the translation operator can recognize context of a sentence to be translated, and can perform a translation process while checking if a suitable context process is performed.

As described above, a translation process can be performed while recognizing a state of a context process in a range to be translated, by displaying context information in correspondence with a range to be translated in original text.

Furthermore, a translation process can be performed while identifying a sentence to be translated, by highlighting the sentence to be translated.

Provided next is the explanation about a method for displaying context information according to the second embodiment of the present invention, by referring to the drawings. This method is intended to display context information yet to be determined, which is obtained by a context process, at the side of a sentence to be translated.

Figure 21:
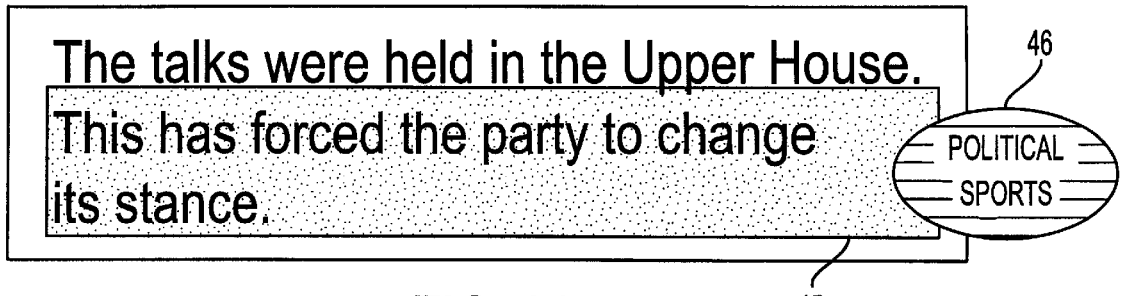
FIG. 21 shows a state where context information is displayed for the original text input to the translating apparatus according to the second embodiment of the present invention.

Assume that the original text displaying unit 1 displays the original text "The talks were held in the Upper House. This has forced the party to change its stance", as shown in FIG. 21A.

The shaded area 45 is made for the original sentence "This has forced the party to change its stance.", which is identified as a sentence to be translated by the translation range identifying unit 45.

Then, the context processing unit 5 performs a context process for the sentence to be translated in which the shaded area 45 is made, and the context processing unit 5 detects the original words "party" and "stance", respectively having a plurality of translated words, from the sentence to be translated in which the shaded area 45 is made. The original word "party" is used for a general field in addition to the political field, while the original word "stance" is used for the general field in addition to the sports field.

This original sentence contained in the shaded area 45, includes no word used in one particular field. Accordingly, the field of the sentence to be translated in which the shaded area 45 is made, cannot be identified at this stage.

Therefore, the original text displaying unit 1 displays the context information 46 yet to be determined, which is extracted by the context processing unit 5 from the sentence to be translated. For example, since the political and sports fields are candidates of the sentence to be translated in which the shaded area 45 is made, the words "political" and "sports" are displayed as the context information 46.

With such a display, a translation operator can recognize whether or not context of a sentence to be translated is determined. As a result, the translation operator can perform a translation process while checking to see if a suitable context process is performed.

As described above, a translation process can be performed while recognizing a state of a context process being performed in a range to be translated, by displaying a plurality of pieces of context information as candidates.

Provided next is the explanation about a method for displaying context information according to the third embodiment of the present invention, by referring to the drawings. This method is intended to display a word at a reference destination, which is obtained by a context process, in correspondence with a word at a reference source.

Figure 22:
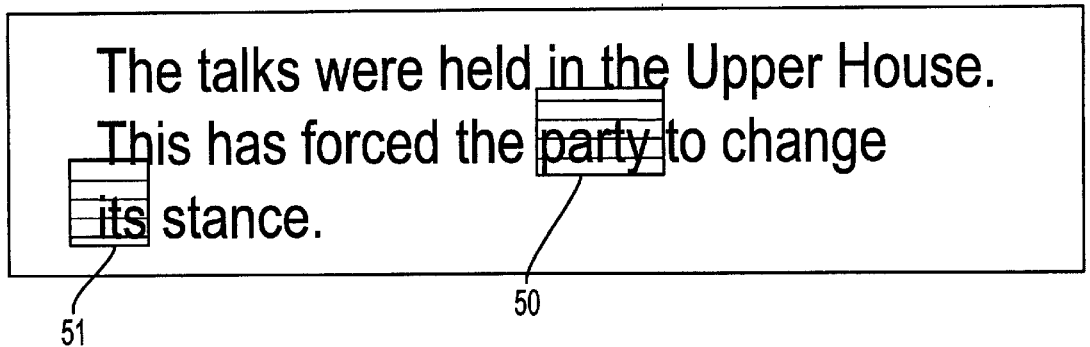
FIG. 22 shows a state where context information is displayed for the original text input to the translating apparatus according to the third embodiment of the present invention.

Assume that the original text displaying unit 1 displays the original text "The talks were held in the Upper House. This has forced the party to change its stance.", as shown in FIG. 22.

The context processing unit 5 performs a context process for a sentence to be translated, and determines that the original word "it" refers to the original word "party".

The original text displaying unit 1 then displays the word at the reference destination in correspondence with the word at the reference source, based on the context information obtained by the context processing unit 5. For example, areas 50 and 51 shaded in identical colors are provided for the original word "party" at the reference destination and the original word "it" at the reference source.

As a result, the translation operator can perform a translation process while checking to see if a process of reference relationship is properly performed.

As described above, a translation process can be performed while recognizing a state of a context process, by highlighting a word at a reference destination and a word at a reference source.

Provided next is the explanation about a method for displaying context information according to the fourth embodiment of the present invention, by referring to the drawings. This method is intended to display a word having a plurality of translated words obtained by a context process in correspondence with a word identifying a field.

Figure 23:
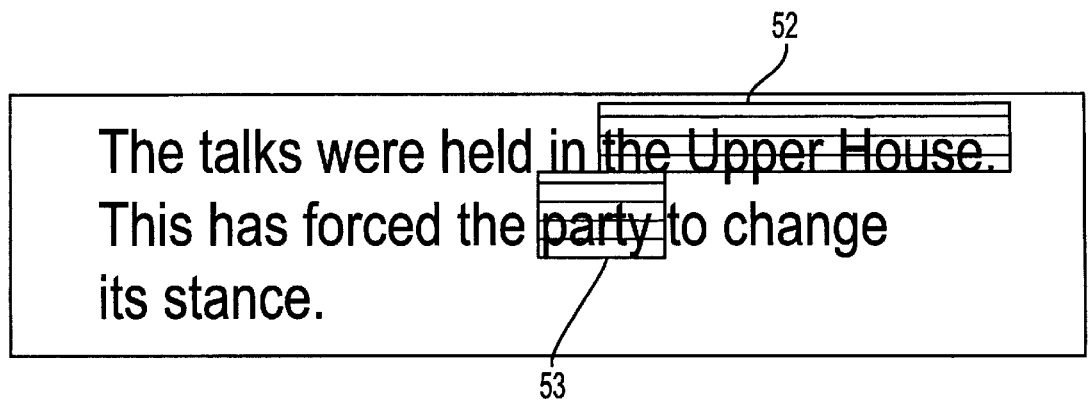
FIG. 23 shows a state where context information is displayed for the original text input to the translating apparatus according to the fourth embodiment of the present invention.

Assume that the original text displaying unit 1 displays the original text "The talks were held in the Upper House. This has forced the party to change its stance.", as shown in FIG. 23.

The context processing unit 5 performs a context process for a sentence to be translated, and locates a word "パーティ" used in a general field and a word "政党" used in the political field, as translated words of the original word "party". Additionally, the compound "Upper House" used in the political field only, is located. Accordingly, it is determined that the sentence to be translated relates to the political field.

As a result, the word "政党" used in the political field is selected as a translated word of the original word "party".

The original text displaying unit 1 displays a word having a plurality of translated words obtained by the context process based on the context information obtained by the context processing unit 5, in correspondence with a word identifying a field. For example, areas 52 an 53 shaded in identical colors are made for the original word "party" having a plurality of translated words, and the compound "Upper House" used as a basis for selecting one of the plurality of translated words for the original word "party".

Accordingly, a translation operator can perform a translation process while checking to see if a process of reference relationship is properly performed for a sentence to be translated.

If there are a plurality of words that could be a basis for selecting a translated word for an original word, only a word closest to the original word may be displayed, in order to prevent a display from being confusing to the user.

For example, if there are a number of words used only in the political field in addition to the compound "Upper House" in a sentence to be translated, only the compound "Upper House" closest to the original word "party" is displayed in correspondence with the original word "party".

In this case, searching for the word closest to the original word "party" to be used as the basis for selecting the translated word, is performed as described below.

That is, the field of the context of the sentence including the original word "party" is determined as being "political", by making a field estimation.

Then, backward scanning is started from the original word "party", and a word in the political field only is searched.

Next, a first searched word among words used in the political field only is displayed. In FIG. 23, the compound "Upper House", for example, corresponds to the first searched word.

Additionally, a translation process can be performed while recognizing a state of a context process, by highlighting a short substitute and its formal name.

Note that a translation process may be performed while recognizing a field name, document type name, formal name or a word at a reference destination, by displaying the above described names or word.

Additionally, context information can be concisely displayed by highlighting a word closest to the first word among second words identifying a translated word of the first word, thereby recognizing a state of a context process with ease.

Furthermore, a sentence to be translated and a context process range can be separately recognized by highlighting the sentence to be translated using a first method, and highlighting the context process range using a second method, thereby performing a translation process while recognizing the context process range.

Provided next is the explanation about a dictionary search apparatus according to an embodiment of the present invention, by referring to the drawings.

Figures 24, 25:
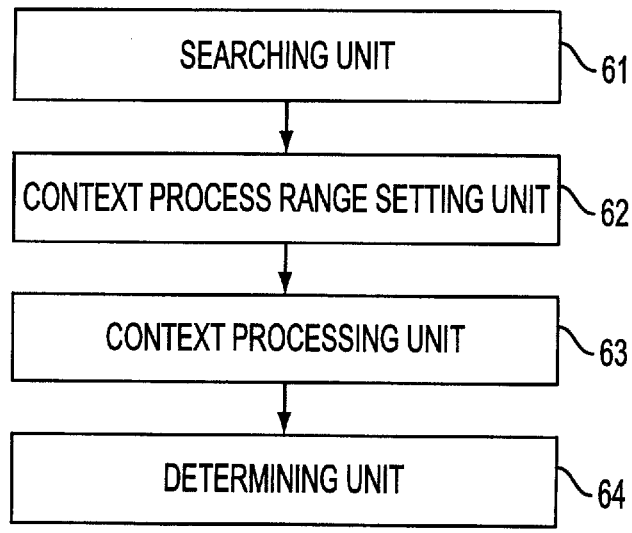
FIG. 24 is a block diagram showing the configuration of a dictionary search apparatus according to an embodiment of the present invention.
FIG. 25 shows a method for specifying an original word input to the dictionary search apparatus according to the embodiment of the present invention.

FIG. 24 is a simplified block diagram showing configuration of the dictionary search apparatus according to the embodiment of the present invention. This apparatus is intended to properly perform a dictionary search process by obtaining appropriate context from a neighborhood of an original word for which a search operation is performed, depending on need.

In FIG. 24, the dictionary search apparatus comprises a searching unit 61, context process range setting unit 62, context processing unit 63, and a determining unit 64.

The searching unit 61 is intended to search a translated word for an original word, when specified.

The context process range setting unit 62 is intended to read original text around a specified original word, and set a context process range, if a plurality of translated words exist for the specified original word.

The context processing unit 63 is intended to perform a context process in a context process range set by the context process range setting unit 62.

The determining unit 64 is intended to determine a translated word for an original word, based on context obtained by the context processing unit 63.

As described above, a dictionary search can be performed in consideration of context by determining a translated word for an original word, thereby performing the dictionary search accurately.

Provided next is the explanation about operations performed by a dictionary search apparatus according to the first embodiment of the present invention. This apparatus is intended to estimate a field as a context process.

Assume that the original text "The talks were held in the Upper House. This has forced the party to change its stance." is displayed, as shown in FIG. 25. First of all, a translation operator who performs a search moves a cursor 70 to a character "r" included in the original word "party", in order to specify this word as an original word for which a search operation is to be performed.

Then, scanning is performed from the character "r" in backward and forward directions until a character space is detected. As a result, the word "party" is recognized as the original word for which the search operation is to be performed.

The searching unit 61 then consults a dictionary for the original word "party", and selects translated words "パーティ" or "政党" when an English-Japanese search is performed. Since there are a plurality of translated words for the original word "party" in this case, a suitable translated word cannot be determined.

Then, a field is estimated to select the suitable translated word for the original word "party". That is, if the original text relates to a general field, the word "パーティ" can be selected as a translated word of the original word "party". Or, if the original text relates to the political field, the word "政党" is selected as the translated word of the original word "party".

The context process range setting unit 62 sets the sentence "This has forced the party to change its stance.", which includes the original word "party", as a context process range, in order to identify a field of the original text.

The context processing unit 63 then performs a context process for the sentence "This has forced the party to change its stance.", which is set by the context process range setting unit 62. Since this sentence includes no word identifying a field in this case, the field of the original word "party" cannot be determined.

Therefore, the context process range setting unit 62 extends the context process range, and sets the text "The talks were held in the Upper House. This has forced the party to change its stance." as a context process range.

The context processing unit 63 then performs a context process for this text set by the context process range setting unit 62. Since this text includes the compound "Upper House" used in the political field only, the field of the original word "party" can be determined to be the political field according to this compound.

The determining unit 64 therefore determines the word "政党" relating to the political field, as the translated word of the original word "party" shown in FIG. 9.

The searching unit 61 consults a dictionary for the original word "party", and selects the translated words "parti" and "groupe", when an English-French search is performed. Since there are a plurality of translated words for the original word "party" in this case, a suitable translated word cannot be determined.

Next, field estimation is made in order to select the suitable word for the original word "party". If the original text relates to a general field, the word "groupe" can be selected as a translated word of the original word "party". Or, if the original text relates to the political field, the word "parti" can be selected as the translated word of the original word "party".

The context process range setting unit 62 sets the sentence "This has forced the party to change its stance.", which include the original word "party", as a context process range, in order to identify the field of the original text.

The context processing unit 63 then performs a context process for the sentence "This has forced the party to change its stance.", which is set by the context process range setting unit 62. Since this sentence does not include a word identifying a field in this case, the field of the original word "party" cannot be determined.

Therefore, the context process range setting unit 62 extends the context process range, and sets the text "The talks were held in the Upper House. This has forced the party to change its stance." as a context process range.

The context processing unit 63 performs a context process for this text set by the context process range setting unit 62. Since this text includes the compound "Upper House" used in the political field only in this case, the field of the original word "party" can be determined to be the political field, based on this compound.

The determining unit 64 therefore determines the word "parti" relating to the political field as the translated word of the original word "party", and displays "parti" with a higher priority. The word "parti" is displayed as a first candidate in the example shown in FIG. 9. If this word is displayed later, the order of the candidates "parti" and "groupe" is changed in order to display "parti" first.

Figure 26:
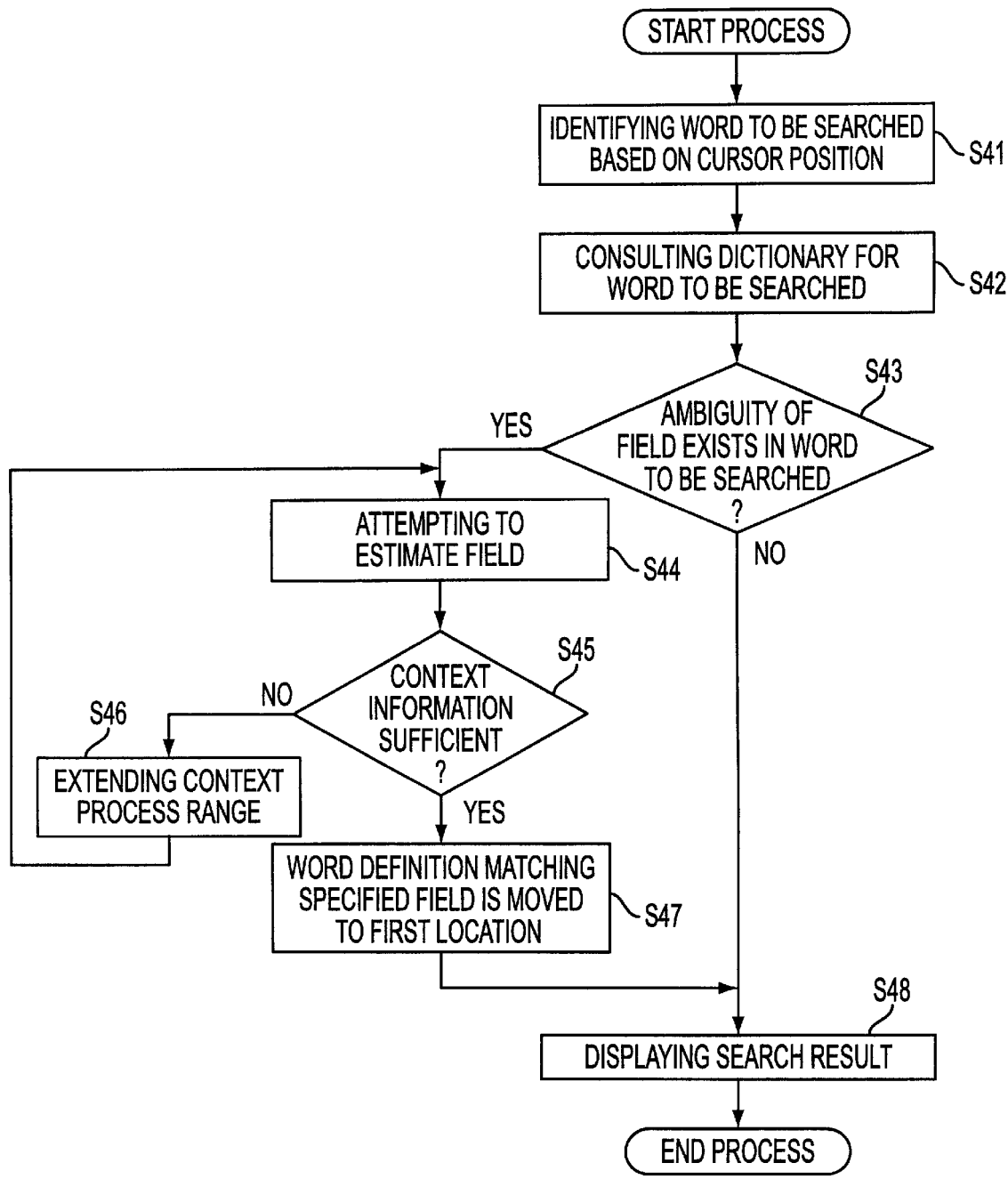
FIG. 26 is a flowchart showing operations performed by the dictionary search apparatus according to a first embodiment of the present invention.

FIG. 26 is a flowchart showing operations performed by the dictionary search apparatus according to the first embodiment of the present invention.

In this figure, a word to be searched is first identified according to a position of the cursor 70 in step S41.

Then, a dictionary is consulted for the word to be searched in step S42.

In step S43, it is determined whether or not ambiguity of a field exists in the word to be searched. If "YES", the process goes to step S44.

In step S44, a context process range is set for original text around the word to be searched, and a field estimation is made for the original text included in the set context process range.

In step S45, it is determined whether or not sufficient context information can be obtained from the context process range. If "NO", the process goes to step S46.

After the context process range is extended in step S46, the process goes back to step S44 in order to repeatedly extend the context process range until sufficient context information can be obtained. If it is determined that sufficient context information can be obtained from the context process range in step S45, the process goes to step S47.

In step S47, a word definition matching an estimated field is moved to a first location.

In step S48, a result of the search is displayed.

If it is determined that the word to be searched has no ambiguity of a field in step S43, the process goes to step S48 to display the word definition of the word searched.

As described above, even if a translated word cannot be determined for an original word, a context process can be efficiently performed for a dictionary search operation by extending a context process range. As a result, the dictionary search can be performed accurately.

In addition, a translated word corresponding to an estimated field can be selected by estimating a field as a context process, if there are a plurality of translated words for an original word. As a result, a dictionary search can be performed accurately.

For example, if first and second translated words respectively belonging to first and second fields for a first original word, and if a second original word outside a range to be translated belongs to the first field, the field of the first original word is estimated by selecting the first translated word for the first original word. As a result, a translated word of the first original word can be determined.

Provided next is the explanation about operations performed by the dictionary search apparatus according to the second embodiment of the present invention, by referring to the drawings. This apparatus completes an abbreviation as a context process.

Assume that the original text "In the last election, the Japan Socialist Party enjoyed victory. The reason for JSP's victory was . . . "is displayed.

A translation operator who makes a search moves a cursor to, for example, the character "J" included in the word "JSP", in order to specify this abbreviation as a word for which a search operation of a word definition is required.

Then, scanning is performed from the character "J" in forward and backward directions until a character space is detected. The word "JSP" is recognized as the word for which a search operation of a word definition is required.

The searching unit 61 consults a dictionary for the word "JSP", and determines this word as being unregistered. Since the word "JSP" is written in uppercase letters in this case, this word is determined as an abbreviation.

The context process range setting unit 62 then sets the sentence "The reason for JSP's victory was . . . ", which includes the abbreviation "JSP", as a context process range, in order to complete the abbreviation "JSP".

The context processing unit 63 then performs a context process for the sentence "The reason for JSP's victory was . . . ", which is set by the context process range setting unit 62. Since this sentence includes no character string which completes the "JSP", the abbreviation "JSP" cannot be completed.

Accordingly, the context process range setting unit 62 extends the context process range, and sets the original text "In the last election, "the Japan Socialist Party enjoyed victory. The reason for JSP's victory was . . . ", as the context process range.

The context processing unit 63 performs a context process for this original text set by the context process range setting unit 62. Since this original text includes the character string "Japan Socialist Party", each of which begins with an uppercase letter "J", "S", and "P", this character string is determined as the character string which completes the abbreviation "JSP".

Then, the searching unit 61 consults a dictionary for the character string "Japan Socialist Party", and retrieves "パーティ" as the definition of this character string.

The determining unit 64 therefore determines "パーティ" as the definition of the word "JSP".

Figure 27:
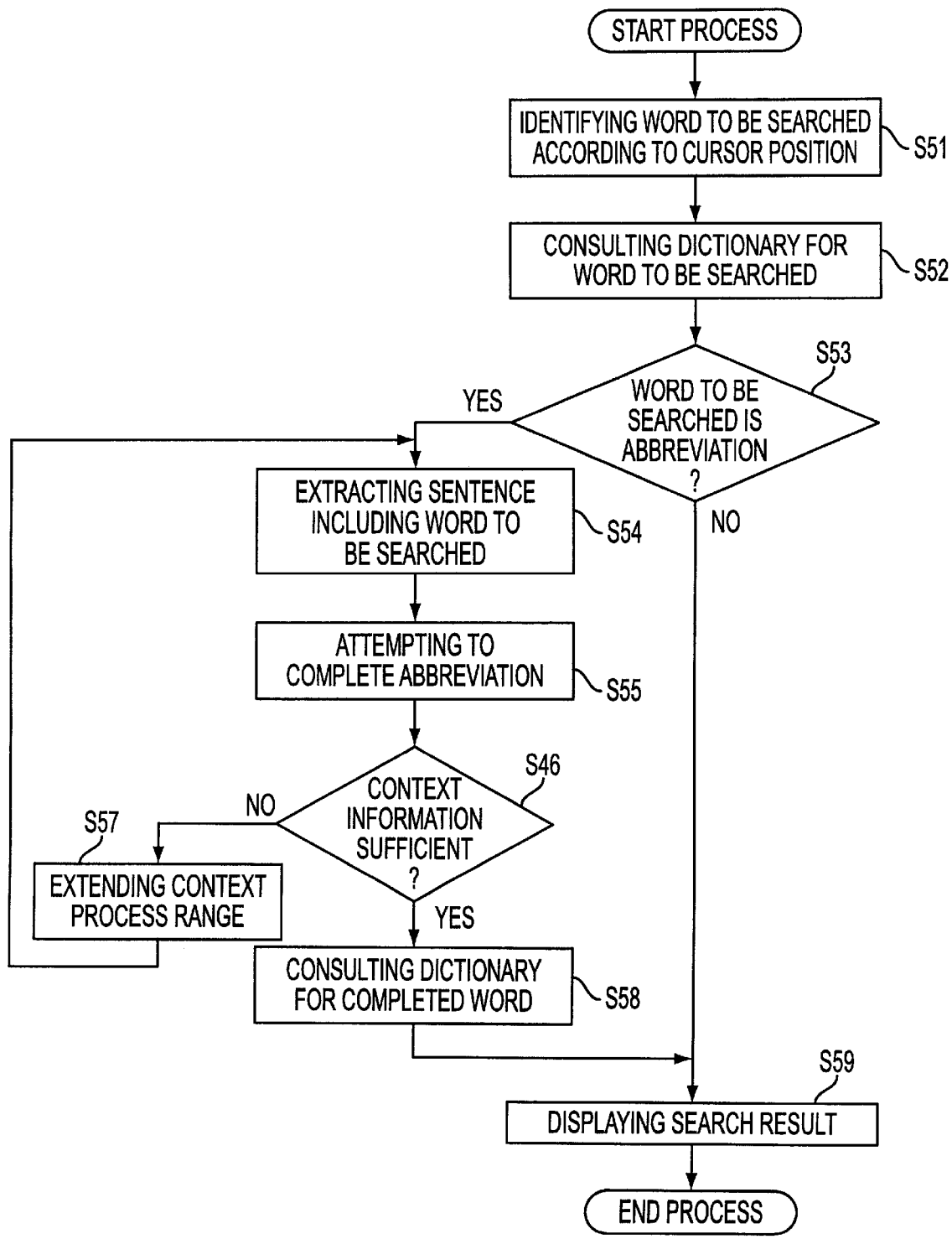
FIG. 27 is a flowchart showing operations performed by the dictionary search apparatus according to a second embodiment of the present invention.

FIG. 27 is a flowchart showing operations performed by the translating apparatus according to the second embodiment of the present invention.

In this figure, a word to be searched is identified according to a position of a cursor in step S51.

Next, a dictionary is consulted for the word to be searched in step S52.

In step S53, it is determined whether or not the word to be searched is an abbreviation. If "YES", the process goes to step S54.

In step S54, a sentence including the word to be searched is set as a context process range.

Then in step S55, it is determined whether or not included in the context process range, and the abbreviation is completed.

In step S56, it is determined whether or not an expression completing the word to be searched exists in the context process range. If "NO", the process goes to step S57.

The context process range is then extended to before and after the sentence including the word to be searched, and the process goes back to step S54.

In the meantime, if the expression completing the abbreviation exists in the context process range, the process goes to step S58.

In step S58, a dictionary is consulted for the completed word to be searched.

In step S59, a definition of the completed word to be searched is displayed.

If the word to be searched is not determined as an abbreviation in step S53, the process goes to step S59 to display a definition of the word to be searched.

As described above, a complete name of an abbreviation can be retrieved by performing a context process such as estimating an abbreviation, thereby performing a dictionary search operation efficiently.

What is claimed is:

1. A dictionary search apparatus, comprising:

specifying means for specifying a word, from an original text, to be searched;

context process range setting means for setting a context process range, which includes text other than the specified word, in the original text;

context processing means for automatically determining a context of the context process range according to a field of the original text; and determining means for determining a definition of the specified word based on determined context; wherein
said context process range setting means extends the context process range one sentence at a time beyond the original text, when the context cannot be determined, until the context can be determined.

2. A dictionary search apparatus, comprising:

a specifying unit specifying a word, from an original text, to be searched;

a context process range setting unit setting a context process range, which includes text other than the specified word, in the original text;

a context processing unit automatically determining a context of the context process range according to a field of the original text; and a determining unit determining a definition of the specified word based on the context; wherein
said context process range setting unit extends the context process range one sentence at a time beyond the original text, when the context cannot be determined, until the context can be determined.

* * * * *